(12) United States Patent
Zhu et al.

(10) Patent No.: US 11,375,192 B2
(45) Date of Patent: Jun. 28, 2022

(54) CODING UNIT DIVISION DECISION METHOD AND DEVICE, ENCODER, AND STORAGE MEDIUM

(71) Applicants: Beijing Kingsoft Cloud Network Technology Co., Ltd., Beijing (CN); Beijing Kingsoft Cloud Technology Co., Ltd., Beijing (CN)

(72) Inventors: Zheng Zhu, Beijing (CN); Xianguo Zhang, Beijing (CN); Xing Jin, Beijing (CN); Juanting Fan, Beijing (CN); Erli Zhang, Beijing (CN)

(73) Assignees: BEIJING KINGSOFT CLOUD NETWORK TECHNOLOGY CO., LTD., Beijing (CN); BEIJING KINGSOFT CLOUD TECHNOLOGY CO., LTD., Beijing (CN)

( * ) Notice: Subject to any disclaimer, the term of this patent is extended or adjusted under 35 U.S.C. 154(b) by 172 days.

(21) Appl. No.: 16/954,047

(22) PCT Filed: Dec. 14, 2017

(86) PCT No.: PCT/CN2017/116257
§ 371 (c)(1),
(2) Date: Jun. 15, 2020

(87) PCT Pub. No.: WO2019/113903
PCT Pub. Date: Jun. 20, 2019

(65) Prior Publication Data
US 2021/0084302 A1   Mar. 18, 2021

(51) Int. Cl.
*H04N 19/119*   (2014.01)
*H04N 19/122*   (2014.01)
(Continued)

(52) U.S. Cl.
CPC ......... *H04N 19/122* (2014.11); *H04N 19/147* (2014.11); *H04N 19/119* (2014.11);
(Continued)

(58) Field of Classification Search
CPC ........ H04N 19/50; H04N 19/61; H04N 19/96; H04N 19/147; H04N 19/36; H04N 19/119
See application file for complete search history.

(56) References Cited

U.S. PATENT DOCUMENTS 9,106,922 B2 * 8/2015 Fludkov ................. H04N 19/52
9,210,442 B2 * 12/2015 Panusopone ........... H04N 19/61
(Continued)

FOREIGN PATENT DOCUMENTS

CN   103067704 A   4/2013
CN   104202612 A   12/2014
(Continued)

OTHER PUBLICATIONS

Fast and adaptive mode decision and CU partition, HEVC; Zhang—2017. (Year: 2017).*
(Continued)

*Primary Examiner* — Luis Perez-Fuentes
(74) *Attorney, Agent, or Firm* — Suiter Swantz pc llo

(57) ABSTRACT

Embodiments of a coding unit division decision method and device, an encoder and a storage medium are disclosed. The method includes: determining the current level of a target CU and obtaining a predicted level of the target CU according to a preset level prediction rule; determining whether the current level is smaller than the predicted level; in case of the current level smaller than the predicted level, performing division decisions on sub-CUs of the target CU to obtain first division decision results; in case of the first division decision results meeting a preset first skip condition, determining that
(Continued)

a division decision result for the target CU is a result comprised of a division result for dividing the target CU into the four sub-CUs and the first division decision results respectively corresponding to the four sub-CUs of the target CU.

18 Claims, 10 Drawing Sheets

(51) Int. Cl.
*H04N 19/147* (2014.01)
*H04N 19/176* (2014.01)
*H04N 19/96* (2014.01)
*H04N 19/36* (2014.01)

(52) U.S. Cl.
CPC ............ *H04N 19/176* (2014.11); *H04N 19/36* (2014.11); *H04N 19/96* (2014.11)

(56) References Cited

U.S. PATENT DOCUMENTS

| | | | | |
|---|---|---|---|---|
| 10,021,391 | B2* | 7/2018 | Park | H04N 19/172 |
| 2014/0146884 | A1* | 5/2014 | Cho | H04N 19/147 |
| | | | | 375/240.12 |
| 2016/0261870 | A1* | 9/2016 | Tu | H04N 19/109 |
| 2016/0323585 | A1* | 11/2016 | Zhai | H04N 19/187 |

FOREIGN PATENT DOCUMENTS

| | | |
|---|---|---|
| CN | 104469360 A | 3/2015 |
| CN | 104602017 A | 5/2015 |
| CN | 105391999 A | 3/2016 |
| CN | 105430391 A | 3/2016 |
| CN | 105430407 A | 3/2016 |
| CN | 105681808 A | 6/2016 |
| CN | 105812795 A | 7/2016 |
| CN | 105812797 A | 7/2016 |
| CN | 106454342 A | 2/2017 |
| CN | 106713935 A | 5/2017 |
| CN | 107071416 A | 8/2017 |
| CN | 107071418 A | 8/2017 |
| CN | 107396121 A | 11/2017 |
| CN | 108259918 A | 7/2018 |
| KR | 20140043015 A | 4/2014 |
| KR | 20150090803 A | 8/2015 |
| WO | 2011096741 A2 | 8/2011 |
| WO | 2013047805 A1 | 4/2013 |
| WO | 2013141596 A1 | 9/2013 |

OTHER PUBLICATIONS

ITU-T; H.265; High efficiency video coding HEVC; Apr. 2013. (Year: 2013).*
On fast coding tree block and mode decision for hevc coding; Tan—2012. (Year: 2012).*
NPL Google Search—Jan. 28, 2022. (Year: 2022).*
Library USPTO NPL query; 2022. (Year: 2022).*
International Search Report dated Aug. 21, 2018 for PCT/CN2017/116257.
Office Action dated Aug. 5, 2020 for Chinese Application No. 201780006045.1.
IN Office Action dated Nov. 10, 2021 for IN Application No. 202027029403.
Notification on Grant of Patent Right for Invention dated Nov. 19, 2020 for CN Application No. 201780006045.1.

* cited by examiner

CODING UNIT DIVISION DECISION METHOD AND DEVICE, ENCODER, AND STORAGE MEDIUM

CROSS REFERENCE TO RELATED APPLICATION

This is a national phase application filed under 35 U.S.C. § 371 of PCT International Application No. PCT/CN2017/116257, filed on Dec. 14, 2017, entitled "CODING UNIT DIVISION DECISION METHOD AND DEVICE, ENCODER, AND STORAGE MEDIUM," which is incorporated herein by reference in its entirety.

TECHNICAL FIELD

The disclosure relates to video encoding and decoding, and more particular, to a coding unit division decision method and device, an encoder and a storage medium.

BACKGROUND

Coding unit (CU) is a basic unit of H.265 coding (High Efficiency Video Coding, known as HEVC), which has a quad-tree structure. A CU is a square block and may be 64×64, 32×32, 16×16, and 8×8 in size. Generally, it is considered that a CU with a size of 64×64 is at level 0, a CU with a size of 32×32 is at level 1, a CU with a size of 16×16 is at level 2 and a CU with a size of 8×8 is at level 3. To improve coding performance, a CU with a level less than 3 may be recursively divided into 4 or more equal sub-CUs based on the structure of the quad-tree.

The division decision of a CU refers to a decision for dividing the CU into a quad-tree. The mode decision of a CU refers to the decision of Skip mode (an inter-frame prediction mode), Merge mode (motion merge mode), inter-frame mode and intra-frame mode and the like for the CU. For CU division decision of a CU, a Top-Down approach is used to traverse all levels of CUs, where the mode decision starts from a CU at a level with smaller value and recursively traverses CUs at all levels. At the end, a division decision result is obtained based on all mode decision results of all CUs. For example, the division decision for a CU at level 2 first calculates rate-distortion cost of the current CU, then respectively calculates rate-distortion costs of four sub-CUs of the current CU (at level 3), and obtains a division decision result for the current CU based on the calculated rate-distortion cost of the current CU and rate-distortion costs of its four sub-CUs.

However, the Top-Down approach requires that the mode decision must be performed on CUs level by level strictly according to the level value. A mode decision is made for a current CU at a level with a smaller value, and then mode decisions are made for four sub-CUs of the current CU. All levels are traversed in such manner to make a mode decision for each CU. Therefore, the encoding is computationally intensive, which results in a low encoding speed.

SUMMARY

An embodiment of the disclosure provides a coding unit division decision method. The method includes:
obtaining a target coding unit (CU);
determining a current level of the target CU;
obtaining a predicted level of the target CU according to a preset level prediction rule;
determining whether the current level is smaller than the predicted level;
in case of the current level smaller than the predicted level, performing division decisions on four sub-CUs of the target CU respectively to obtain a first division decision result for each of the sub-CUs;
determining whether the first division decision results meet a preset first skip condition; and
in case of the first division decision results meeting the preset first skip condition, determining a target division decision result for the target CU as a second division decision result, wherein the second division decision result comprises a division result for dividing the target CU into the four sub-CUs and the first division decision results for the four sub-CUs of the target CU.

An embodiment of the disclosure provides a coding unit division decision device, which includes:
a first obtaining module configured for obtaining a target coding unit (CU);
a first determining module configured for determining a current level of the target CU;
a second obtaining module configured for obtaining a predicted level of the target CU according to a preset level prediction rule;
a first determination module configured for determining whether the current level is smaller than the predicted level;
a first decision module configured for, when a determining result from the first determination module is that the current level is smaller than the predicted level, performing division decisions on four sub-CUs of the target CU respectively to obtain a first division decision result for each of the sub-CUs;
a second determination module configured for determining whether the first division decision results meet a preset first skip condition; and
a second determining module configured for, when a determining result from the second determination module is that the first division decision results meet the preset first skip condition, determining a target division decision result for the target CU as a second division decision result, wherein the second division decision result comprises a division result for dividing the target CU into the four sub-CUs and the first division decision results for the four sub-CUs of the target CU.

An embodiment of the disclosure further provides an encoder applying any of the coding unit division decision devices above.

An embodiment of the disclosure further provides an encoder including a processor and a memory; wherein
the memory is configured for storing a computer program; and
the processor is configured for, when executing the computer program stored in the memory, implementing steps of any of the coding unit division decision methods above.

An embodiment of the disclosure further provides a computer-readable storage medium having stored thereon a computer program that, when executed by a processor, causes the processor to carry out the steps of any of the coding unit division decision methods above.

An embodiment of the disclosure further provides a computer program product containing instructions which, when executed on a computer, causes the computer to carry out the steps of any of the coding unit division decision methods above.

An embodiment of the disclosure further provides a computer program that, when executed on a computer, causes the computer to carry out the steps of any of the coding unit division decision methods above.

BRIEF DESCRIPTION OF THE DRAWINGS

In order to more clearly describe the technical solutions of the embodiments of the disclosure or of the related art, a brief description is given below for the drawings used in embodiments and the related art. Apparently, the drawings described below are for only some embodiments of the disclosure; other drawings can also be obtained based on the drawings herein without any creative efforts.

DETAILED DESCRIPTION

For a thorough understanding of the object, technical solutions and advantages of the disclosure clearer and clearer, the disclosure is further described in detail with reference to the accompanying drawings and embodiments below. The described embodiments are only a part, but not all of the embodiments of the disclosure. All other embodiments obtained based on the embodiments in the disclosure without creative efforts shall fall within the protection scope of the disclosure.

The disclosure is described in detail through specific embodiments below.

Figure 1:
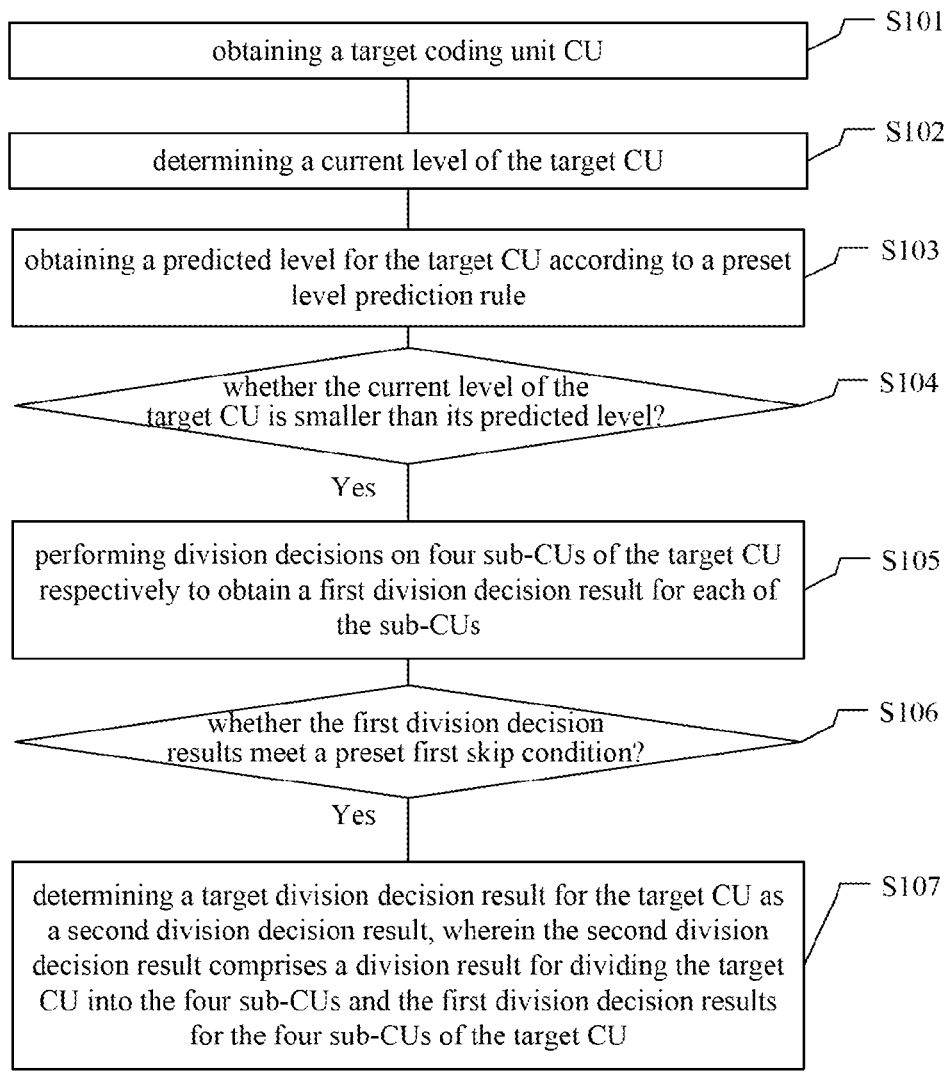
FIG. 1 is a schematic flowchart of a first coding unit division decision method provided by an embodiment of the disclosure.

FIG. 1 is a schematic flowchart of a coding unit division decision method provided by an embodiment of the disclosure. The method includes the following steps.

At step S101, a target coding unit CU is obtained.

A coding unit (CU) is a basic coding unit, for example, in the H.265 coding standard, a coding unit has a quad-tree structure. A CU is a square block, and may be 64×64, 32×32, 16×16 and 8×8 in size. For a video frame, it is composed of a great number of coding units. For example, the video frame shown in FIG. 2 includes a plurality of coding units E, F, G, H, J and K.

Figure 2:
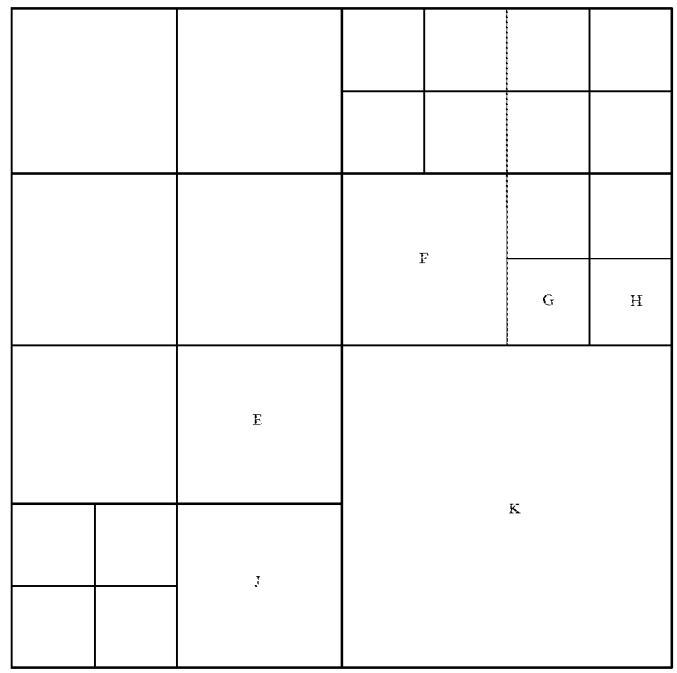
FIG. 2 is a diagram showing the structure of a specific coding unit K provided by an embodiment of the disclosure.

In an embodiment of the disclosure, the target coding unit is a coding unit on which a division decision is being performed currently. Referring to FIG. 2, assuming the coding unit K is the coding unit on which a division decision is being performed currently, this coding unit is thus the target coding unit in the embodiment of the disclosure.

A division decision for the coding unit may include: a selection of a manner for dividing the coding unit, and a mode selection for each of sub-coding units obtained through division in the case of dividing the coding unit; or the division decision for the coding unit may include: a mode selection for the coding unit in the case of not dividing the coding unit. The mode decision for a coding unit may be a selection of a mode such as Skip, Merge, intra-frame, inter-frame, etc. of the coding unit.

Consequently, a division decision result for the coding unit may include two results. The first result is a comprehensive result of mode decision results for all sub-coding units, which are obtained by dividing the coding unit in a division manner for the coding unit, and the second result being mode decision result for the coding unit in the case of not dividing the coding unit.

At step S102, a current level of the target CU is determined.

In the embodiment of the disclosure, the current level refers to a level of the coding unit on which the division decision is being performed currently, i.e., the level of the target coding unit. Since the coding unit has a quad-tree structure, the size of a coding unit before and after a division is generally represented by its level. Taking H.265 as an example, the largest CU has a size of 64×64, and it may define that a CU with a size of 64×64 has a level of 0, a CU with a size of 32×32 has a level of 1, a CU with a size of 16×16 has a level of 2, and a CU with a size of 8×8 has a level of 3. Once the level of a CU is defined, the size of the CU may be directly determined based on the level of the CU. The smaller the level of the CU is, the larger the size of the CU is.

For illustration purpose, the coding unit K shown in FIG. 2 is taken as an example hereinafter to explain the coding unit division decision method provided by the disclosure.

Referring to FIG. 2, it is assumed that the target coding unit is the coding unit K with a size of 64×64 and division decisions for all neighboring coding units of the coding unit K have been completed. It should be noted that a coding unit with a size of 64×64 is generally referred to as a Coding Tree Unit (CTU). CTU is also the largest coding unit in the H.265 coding standard. Thus, a CTU is usually selected as an initial target coding unit in the coding process. For example, the coding unit K shown in FIG. 2 is a CTU. Thus, the current level of the coding unit K may be determined as 0. By comparing the size of the coding unit K and the sizes of its neighboring coding units, it can be determined that the coding unit E has a level of 1, the coding unit F has a level of 1, the coding unit G has a level of 2, the coding unit H has a level of 2, and the coding unit J has a level of 1, as shown in FIG. 2.

At step S103, a predicted level of the target CU is obtained according to a preset level prediction rule.

In general, neighboring coding units in a same video frame may contain similar contents. Even if there is a difference in contents between the neighboring coding units, the difference is usually a slight difference. Therefore, the neighboring coding units may have similar division decisions, and there is a similarity between the levels of the neighboring coding units. Based on such consideration, in an embodiment of the disclosure, the predicted level of the target coding unit may be obtained based on the levels of the neighboring coding units of the target coding unit.

In obtaining the predicted level of the target CU according to the preset level prediction rule, a determination is made as to whether the level of a left neighboring CU and/or the level of a top neighboring CU of the target CU are known.

In an embodiment, a determination is made as to whether the level of the left neighboring CU and the level of the top neighboring CU of the target CU are known.

In case of the level of the left neighboring CU being known and the level of the top neighboring CU being unknown, the predicted level of the target CU is determined as the level of the left neighboring CU.

In case of the level of the top neighboring CU being known and the level of the left neighboring CU being unknown, the predicted level of the target CU is determined as the level of the top neighboring CU.

In case of the level of the left neighboring CU and the level of the top neighboring CU being known, the predicted level of the target CU is determined as a highest level of the level of the left neighboring CU and the level of the top neighboring CU.

In case of the level of the left neighboring CU and the level of the top neighboring CU being unknown, the predicted level of the target CU is determined as a level of a reference CU, wherein the reference CU comprises a CU in a previous video frame before a video frame where the target CU is located, and the position of the CU in the previous video frame is the same as the position of the target CU in the video frame;

when the reference CU is not available, the predicted level of the target CU is determined as 0. For example, in a case where the levels of the left and top neighboring CUs are unknown and the level of the reference CU may not be obtained due to such as loss of the previous video frame. In such a case, the predicted level of the target CU will be determined as 0.

The left neighboring CU and the top neighboring CU of the target coding unit refers to a CU located on the left of the target coding unit and a CU located on top of the target coding unit considering the upper left corner of the target coding unit as a reference. Referring to FIG. 2, for example, the coding unit K is taken as the target coding unit. The left neighboring CU of the coding unit K is the coding unit E, and the top neighboring CU of the coding unit K is the coding unit F. As described above, the level of the coding unit E is 1 and the level of the coding unit F is 1. Based on the discussion above that "in case of the level of the left neighboring CU and the level of the top neighboring CU being known, the predicted level of the target CU is determined as a highest level of the level of the left neighboring CU and the level of the top neighboring CU", the predicted level of the coding unit K may be determined to be 1.

In an embodiment, a determination is made as to whether the level of the left neighboring CU of the target CU is known.

In case of the level of the left neighboring CU being known, when the level of the top neighboring CU is unknown, the predicted level of the target CU is determined as the level of the left neighboring CU; and when the level of the top neighboring CU is known, the predicted level of the target CU is determined as the highest level of the level of the left neighboring CU and the level of the top neighboring CU.

In case of the level of the left neighboring CU being unknown, when the level of the top neighboring CU is known, the predicted level of the target CU is determined as the level of the top neighboring CU; and when the level of the top neighboring CU is unknown, the predicted level of the target CU is determined as the level of the reference CU; and when the level of the top neighboring CU is unknown and the reference CU is not available, the predicted level of the target CU is determined as 0.

In an embodiment, a determination is made as to whether the level of the top neighboring CU of the target CU is known.

In case of the level of the top neighboring CU being known, when the level of the left neighboring CU is unknown, the predicted level of the target CU is determined as the level of the top neighboring CU; and when the level of the left neighboring CU is known, the predicted level of the target CU is determined as the highest level of the level of the top neighboring CU and the level of the left neighboring CU.

In case of the level of the top neighboring CU being unknown, when the level of the left neighboring CU is known, the predicted level of the target CU is determined as the level of the left neighboring CU; and when the level of the left neighboring CU is unknown, the predicted level of the target CU is determined as the level of the reference CU; and when the level of the left neighboring CU is unknown and the reference CU is not available, the predicted level of the target CU is determined as 0.

At step S104, it is determined whether the current level of the target CU is smaller than the predicted level of the target CU.

At step S105, when it is determined that the current level of the target CU is smaller than the predicted level of the target CU, division decisions are respectively performed on four sub-CUs of the target CU to obtain a first division decision result for each of the sub-CUs.

As in the above example, the current level of the coding unit K is determined to be 0, and the predicted level of the coding unit K is determined to be 1. Thus, the current level of the coding unit K is smaller than its predicted level. As discussed above, the smaller the level of a coding unit is, the larger the coding unit will be. Therefore, the size of the coding unit K is larger than the largest one of its neighboring coding units. The neighboring coding units of the coding unit K are divided into relatively small coding units, this means that the content of the area where the coding unit K is located is relatively complex. Considering there is a similarity between neighboring coding units, dividing the coding unit K into smaller coding units may get a better coding effect. Thus, there is a higher possibility that the coding unit K needs to be divided into four sub-coding units.

Figure 3:
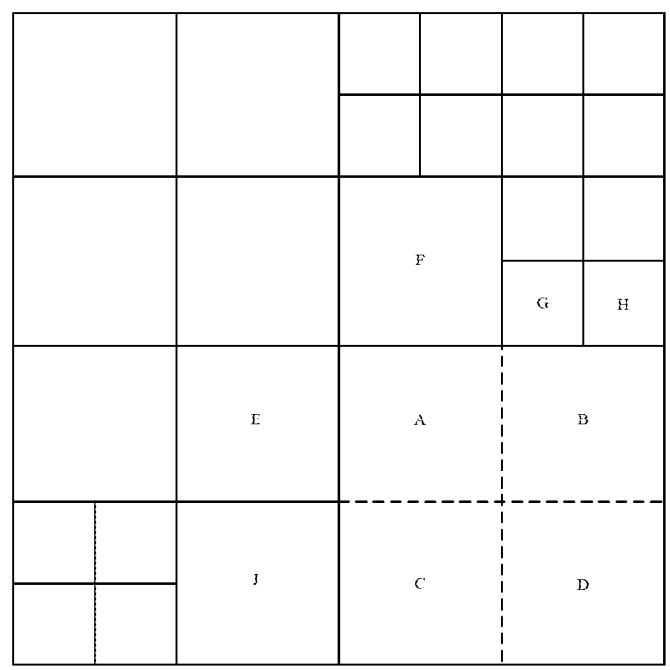
FIG. 3 is a diagram showing the structure of four sub-coding units A, B, C, and D of the coding unit K in FIG. 2.

Consequently, when it is determined that the current level of the coding unit K is smaller than its predicted level, the division decisions for the four sub-coding units of the target coding unit are directly performed respectively. Referring to FIG. 3, a schematic diagram showing the structure of the four sub-coding units A, B, C, D of the coding unit K in FIG. 2 is depicted. Division decisions are respectively performed on the four sub-coding units A, B, C, D of the coding unit K to obtain a first division decision result for each of the sub-CUs.

In practice, to obtain the first division decision result for each of the sub-CUs, the division decisions may be performed on the four sub-CUs of the target CU by respectively determining the four sub-CUs of the target CU as target CUs according to a preset rule and returning to step S102.

In other words, in an embodiment of the disclosure, the step (S105) of performing the division decisions on the four sub-CUs of the target CU respectively to obtain the first division decision result for each of the sub-CUs may include:

determining the four sub-CUs of the target CU as target CUs according to the preset rule respectively, and returning to the step of determining the current level of the target CU.

The above preset rule includes a rule indicating the sequence in which the division decisions are performed on the four sub-coding units. Considering the reference relations between the neighboring coding units in the coding process, the division decisions have to be performed on the coding units in a specific sequence. The division decisions may be performed in a Z-shape sequence. The Z-shape sequence is also referred as a Zig-Zag sequence. Consequently, in performing the division decisions on the four sub-coding units of the target coding unit, it determines the four sub-coding units as target coding units one by one sequentially and returns to step S102.

For example, the division decisions may be performed in the Z-shape sequence on the four sub-coding units A, B, C, D of the coding unit K. Therefore, the division decisions may be performed on the four sub-coding units A, B, C, D of the coding unit K in the following sequence: the sub-coding unit A→the sub-coding unit B→the sub-coding unit C→the sub-coding unit D.

At step S106, it is determined whether the first division decision results meet a preset first skip condition.

After performing the division decisions on the four sub-coding units A, B, C, D of the coding unit K respectively, division decision results a, b, c, d for all sub-coding units are obtained, and each of the division decision results a, b, c, d contains a rate-distortion cost. In general, factors such as hardware performance and requirements for real-time performance of an encoder may be taken into consideration. In case the division decision results (i.e., a second division decision result described below) for the four sub-coding units A, B, C, D of the coding unit K have shown a better effect, performing a further division decision on each sub-coding unit may produce a much better division decision result. However, performing a division decision each time will take time, which will increase the consumed time.

To save coding time, when the division decision results for the four sub-coding units A, B, C, D have shown a better effect, a further division decisions on the four sub-coding units A, B, C, D may not be required, and the method directly jump out of the coding process. In practice, whether the division decision results for the four sub-coding units A, B, C, D show a better effect is generally determined by determining whether the first division decision results meet the preset first skip condition. It should be noted that the term "first" herein is used to only distinguish the preset condition in the embodiment from a preset condition in other embodiments, and has no specific meaning.

In practice, whether the first division decision results meet the first skip condition may be determined based on one or more of items of information, such as a rate-distortion cost, a residual, a motion vector, and the current level of the target CU contained in the first division decision results. Of course, other information may also be used for determining whether the first division decision results meet the first skip condition, which will not be limited herein.

For example, it may determine whether the sum of the rate-distortion costs of respective first division decision results is smaller than or equal to a preset threshold. In case of the sum of the rate-distortion costs smaller than or equal to the preset threshold, it can be determined that the first division decision results meet the preset first skip condition.

Alternatively or additionally, it may determine whether the current level of the target CU is larger than or equal to a preset value, and in case of the current level of the target CU larger than or equal to the preset value, it can be determined that the first division decision results meet the preset first skip condition.

For example, it is assumed that the rate-distortion cost in a first division decision result a for the sub-coding unit A is 1500, the rate-distortion cost in a first division decision result b for the sub-coding unit B is 2100, the rate-distortion cost in a first division decision result c for the sub-coding unit C is 1600, the rate-distortion cost in a first division decision result d for the sub-coding unit D is 1800, and the preset threshold is 8000. The sum of these rate-distortion costs is calculated as 7000, which is smaller than the preset threshold of 8000. It may be determined that the first division decision results meet the preset first skip condition.

Alternatively, it is assumed that the current level of the coding unit K is 0 and the preset value is set to 2. The current level of the coding unit K is smaller than the preset value, and thus it can be determined that the first division decision results do not meet the preset first skip condition.

Alternatively, the determination is made based on a combination of the above two determination rules, that is, after determining the sum of distortion rate costs in the first division decision results is smaller than or equal the preset threshold, it is further determined whether the current level of the target coding unit is larger than or equal to the preset threshold. In case of the current level of the target coding unit larger than or equal to the preset threshold, it is determined that the first division decision results meet the preset first skip condition. For example, after determining that the calculated sum of the rate-distortion costs of 7000 is smaller than the preset threshold of 8000 based on the determination rule, it is further determined that the current level of the coding unit K is 0, which is smaller than the preset value 2. Thus, it is determined that the first division decisions do not meet the preset first skip condition.

It should be noted that, the preset first skip condition is a specific condition provided by the embodiment of the disclosure, which is not limited thereto.

At step S107, when the first division decision results meet the preset first skip condition, a target division decision result for the target CU is determined a second division decision result; wherein the second division decision result includes a division result for dividing the target CU into the four sub-CUs and the first division decision results for the four sub-CUs of the target CU.

It can be appreciated that, in the embodiment of the disclosure, in the case where the first division decision results meet the preset first skip condition, the target division decision result for the target CU includes two aspects: the first aspect, a decision that the target CU needs to be divided into four sub-CUs; and the second aspect, the first division results for the four sub-CUs obtained by dividing the target CU.

It is known from above, on one hand, when the sum of the rate-distortion costs in the first division decision results for the four sub-coding units of the target coding unit is smaller than or equal to the preset threshold, it may be determined that the second division decision already have a better effect. To save coding time, no further division decision is needed to be performed.

On the other hand, it is noted that the step S107 is performed when the current level of the target coding unit is smaller than its predicted level. When the size of the target coding unit is small enough, that is, the current level of the target coding unit is relatively big, a further quad-tree division cannot be performed. For example, the predicted level of a target coding unit is 3, the current level of the target coding unit is 2, and the preset value is 2; thus, the current level of the target coding unit is equal to the preset value, at this point, the levels of the four sub-coding units of the target coding unit are 3, and a further quad-tree division cannot be performed. In such a case, no matter whether the second division decision result has a better effect or not, no further division will be performed.

As seen from above, in the embodiment shown in FIG. 1, the predicted level of the target CU is proposed, and the division decision is determined by comparing the current level and the predicted level to obtain the first division decision results. In the case where the first division decision results meet the preset first skip condition, the target division decision result for the target CU is directly determined without performing a mode decision on the target CU, which reduces the computation amount and thus improves the encoding speed.

Figure 4:
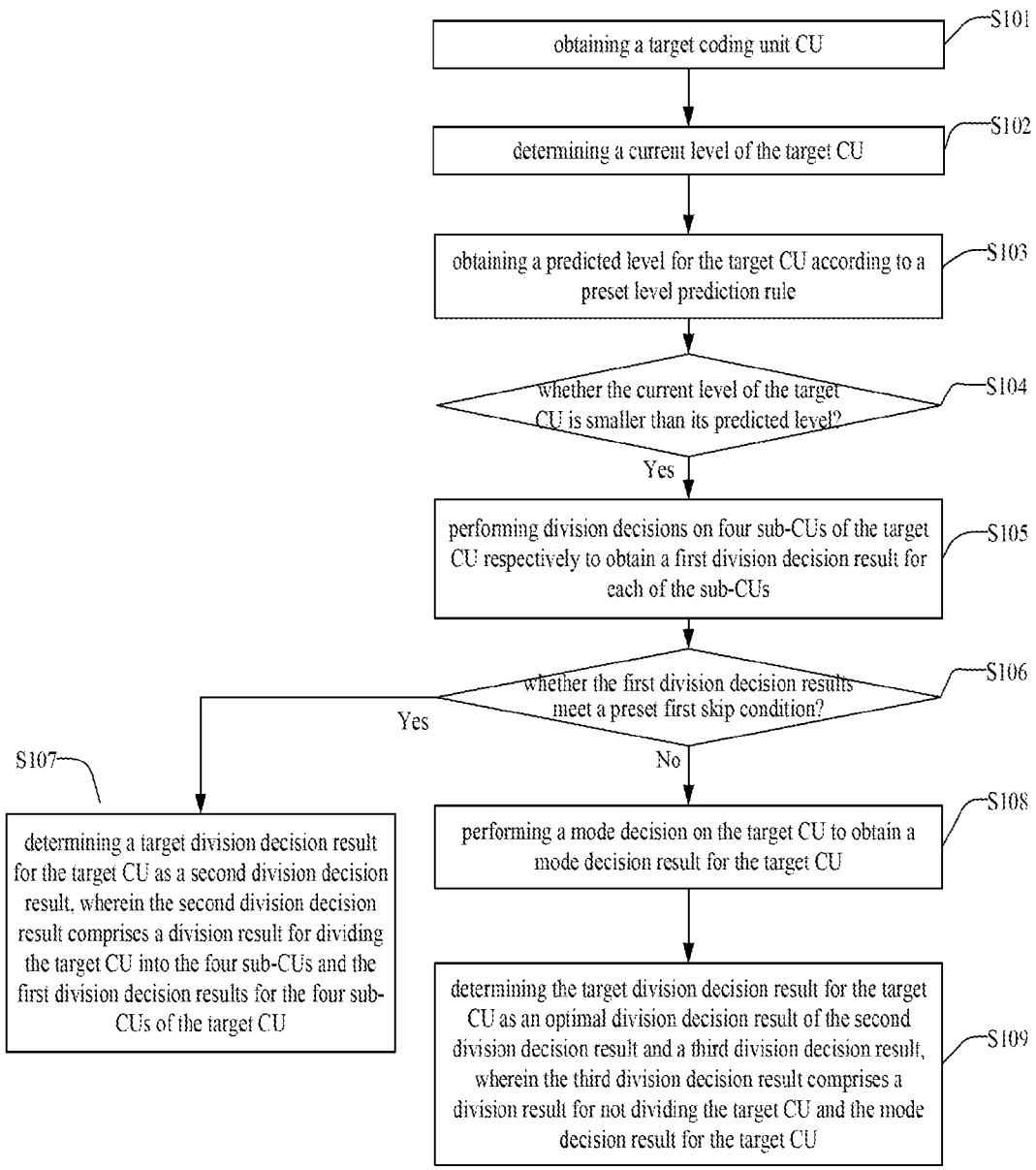
FIG. 4 is a schematic flowchart of a second coding unit division decision method provided by an embodiment of the disclosure.

Based on the embodiment shown in FIG. 1, FIG. 4 shows a schematic flowchart of a second coding unit division decision method provided by an embodiment of the disclosure. The method may further include the following steps.

At step S108, when the first division decision results do not meet the preset first skip condition, a mode decision is performed on the target CU to obtain a mode decision result for the target CU.

The case where the first division decision results do not meet the preset first skip condition may be that the sum of the rate-distortion costs in the first division decision results for the four sub-CUs of the target CU may be larger than the preset threshold, or that the current level of the target CU may be smaller than the preset value.

As discussed above, contents contained in neighboring coding units may be similar to each other. While for a video frame in which the content changes significantly, there may be a big difference between the target coding unit and its neighboring coding units. Even the division decision is performed on the target coding unit by referring to the neighboring coding units, while only performing the division decisions on the four sub-coding units of the target coding unit may not produce a better division decision result. it may also necessary to consider a division decision result for not dividing the target coding unit. Thus, in an embodiment of the disclosure, in the case where it is determined that the first division decision results do not meet the preset first skip condition, a mode decision may be performed on the target CU to obtain a mode decision result for the target CU.

Similar to the first division decision results for the four sub-coding units of the target coding unit, the obtained mode decision result for the target coding unit include a rate-distortion cost.

At step S109, the target division decision result for the target CU is determined as an optimal division decision result of the second division decision result and a third division decision result, wherein the third division decision result includes a division result for not dividing the target CU and the mode decision result for the target CU.

It can be appreciated that, in the case where the first division decision results do not meet the first skip condition, the determined target division decision result also includes two aspects: the first aspect, a decision that the target CU doesn't need to be divided into four-sub CUs; and the second aspect, the mode decision result for the target CU.

After obtaining the mode decision result for the target coding unit itself, the second division decision result and the third division decision result corresponding to the target coding unit need to be considered comprehensively. The rate-distortion cost in the third division decision result for the target coding unit is compared with the sum of the rate-distortion costs in the first division decision results for the four sub-coding units of the target coding unit, and then a better division decision result of the second division decision and the third division decision is determined as the mode decision result for the target CU. Generally, the smaller the rate-distortion cost is, the better the corresponding decision result will be.

Consequently, as an optional implementation of the embodiment of the disclosure, the step of determining the target division decision result for the target CU as an optimal division decision result of the second division decision result and a third division decision result (S109), may include:

determining whether a rate-distortion cost in the second division decision result is smaller than or equal to a rate-distortion cost in the third division decision result;

in case of the rate-distortion cost in the second division decision result smaller than or equal to the rate-distortion cost in the third division decision result, determining the target division decision result for the target CU as the second division decision result; and in case of the rate-distortion cost in the second division decision result not smaller than and not equal to the rate-distortion cost in the third division decision result, determining the target division decision result for the target CU as the third division decision result.

It can be appreciated that the rate-distortion cost in the second division decision result is the sum of the rate-distortion costs of all the first division decision results for the four sub-coding units of the target coding unit.

By way of example, it is assumed that the target coding unit is the coding unit K shown in FIG. 2, with the operations described above, the third division decision result for the coding unit K is obtained as k, the obtained first division decision results respectively corresponding to the four sub-coding units A, B, C, D of the coding unit K are: a first division decision result a, a first division decision result b, a first division decision result c, and a first division decision result d. It is assumed that the rate-distortion cost in the third division decision result is 6500, and the sum of the rate-distortion costs in the first division decision results a, b, c, d is 7000.

It is known that the smaller the rate-distortion cost is, the better the corresponding division decision result will be. It can be determined that the third division decision result is better than the second division decision result, by comparing the sum of the rate-distortion costs in the first division decision results and the rate-distortion cost in the third division decision result. Thus, the third division decision result is taken as the target division decision result for the coding unit K.

Applying the embodiment shown in FIG. 4, in the case where first division decision results do not meet the preset first skip condition, the mode decision is performed on the target coding unit to obtain the mode decision result and then obtain the third division decision result. The optimal division decision result is selected from the second division decision result and the third division decision result and is determined as the target division decision result for the target coding unit. This improves the accuracy of the division decision.

Figure 5:
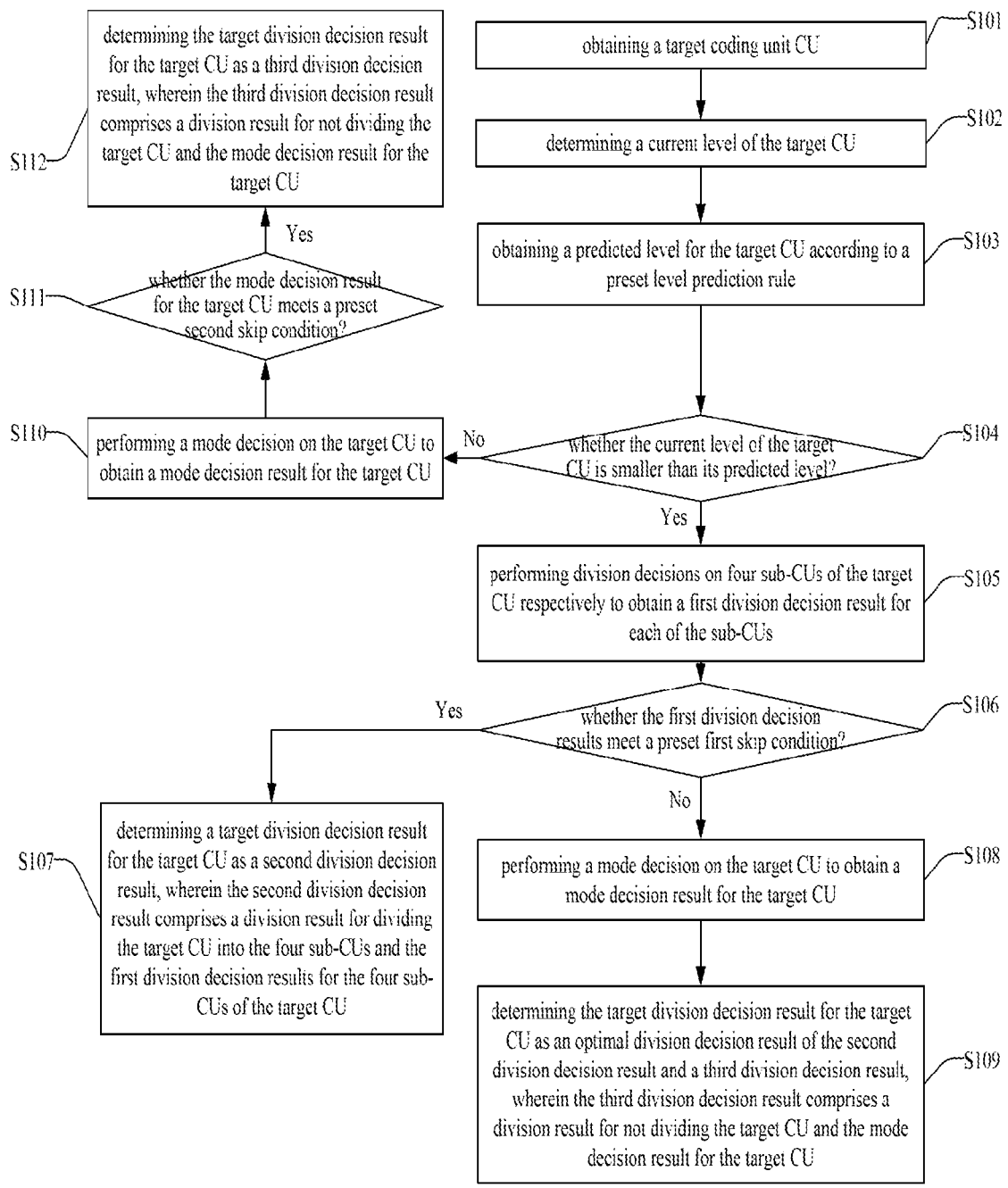
FIG. 5 is a schematic flowchart of a third coding unit division decision method provided by an embodiment of the disclosure.

Based on the embodiment shown in FIG. 4, FIG. 5 shows a schematic flowchart of a third coding unit division decision method provided by an embodiment of the disclosure, and the method may further include the following steps.

At step S110, when the current level of the target CU is not smaller than its predicted level, a mode decision is performed on the target CU to obtain a mode decision result for the target CU.

It is easy to understand that the target coding unit may be any coding unit in a video frame, and when the size of the target coding unit is small, i.e., the current level of the target coding unit is large, the current level of the target coding unit may be larger than or equal to the levels of its neighboring coding units, in other word, the size of the target coding unit is smaller than the smallest one of its neighboring coding units. Since the levels of the neighboring coding units are similar and the target coding unit is already smaller than its neighboring coding units, in fact, a better division decision result can be obtained by performing directly the mode decision on the target coding unit itself. Thus, in an implementation of the disclosure, in the case where the current level of the target coding unit is not smaller than its predicted level, the mode decision is directly performed on the target coding unit to obtain the mode decision result for the target coding unit.

For example, as shown in FIG. 3, it is assumed that the target coding unit is a coding unit A. The current level of the coding unit A is 1. The level of the left neighboring coding unit E of the coding unit A is 1, and the level of the top neighboring coding unit F of the coding unit A is 1. Therefore, the predicted level of the coding unit A is 1. It can be seen that the current level of the coding unit A is equal to its predicted level. Due to a strong reference relations between the coding unit A and its neighboring coding units, in case of the current level of the target coding unit A greater than or equal to the levels of its neighboring coding units, that is, the size of the coding unit A is smaller than or equal to the sizes of its neighboring coding units, it can be predicted that a division decision result for not dividing the coding unit A can have a better effect.

Consequently, in the case where it is determined that the current level of the coding unit A is larger than or equal to its predicted level, a mode decision is directly performed on the coding unit A to obtain a mode decision result for the coding unit A.

The step of performing the mode decision on the target CU to obtain the mode decision result for the target CU (S110) may include:

calculating a rate-distortion cost for the target CU to obtain the mode decision result for the target CU.

Techniques related to the rate-distortion cost for the target CU is known from the related art, which will be not described in details herein.

At step S111, it is determined whether the mode decision result for the target CU meets a preset second skip condition.

This step is similar to the step S106, the difference is in that determination in step S106 is for the first division decision results for the four sub-coding units of the target coding unit, while the determination in this step is for the mode decision result for the target coding unit.

For example, whether the mode decision result for the target coding unit meets the preset second skip condition may be determined based on one or more items of information, such as a rate-distortion cost, a residual, a motion vector, and the current level of the target CU contained in the mode decision result. Of course, other information may also be used for determining whether the mode decision result for the target coding unit meets the preset second skip condition, which will not be limited herein.

For example, it may be determined whether the rate-distortion cost in the mode decision result for the target CU is smaller than or equal to a preset threshold. In case of the rate-distortion cost in the mode decision result for the target CU smaller than or equal to the preset threshold, it can be determined that the mode decision result for the target CU meets the preset second skip condition.

Alternatively or additionally, it may determine whether the current level of the target CU is larger than or equal a preset value; and in case of the current level of the target CU larger than or equal to the preset value, it can be determined that the mode decision result for the target CU meets the preset second skip condition.

It can be understood that there is no substantial distinction between the "preset first skip condition" and the "preset second skip condition", which are only used for distinguishing different steps. In fact, the preset threshold and the preset value in the above two preset conditions may be set to a same value or set to different values, and the specific setting of the threshold and value will not be restricted herein. Because this step is similar to the step S106 in principle, description for this step will not be repeated here, and the same content may refer to the corresponding description.

At step S112, when the mode decision result for the target CU meets the preset second skip condition, the target division decision result for the target CU is determined as a third division decision result; wherein the third division decision result includes a division result for not dividing the target CU and the mode decision result for the target CU.

It is known from above, in case of the rate-distortion cost in the mode decision result corresponding to the coding unit A smaller than the preset threshold, or the level of the coding unit A is larger than or equal to its predicted level, it is determined that the third division decision result already has a better effect. At this point, the coding unit A may not be divided, and division decisions on the four sub-coding units of the coding unit A may not be performed. Therefore, by applying the embodiment of the disclosure, the computation amount can be reduced and the encoding speed can be improved.

Figure 6:
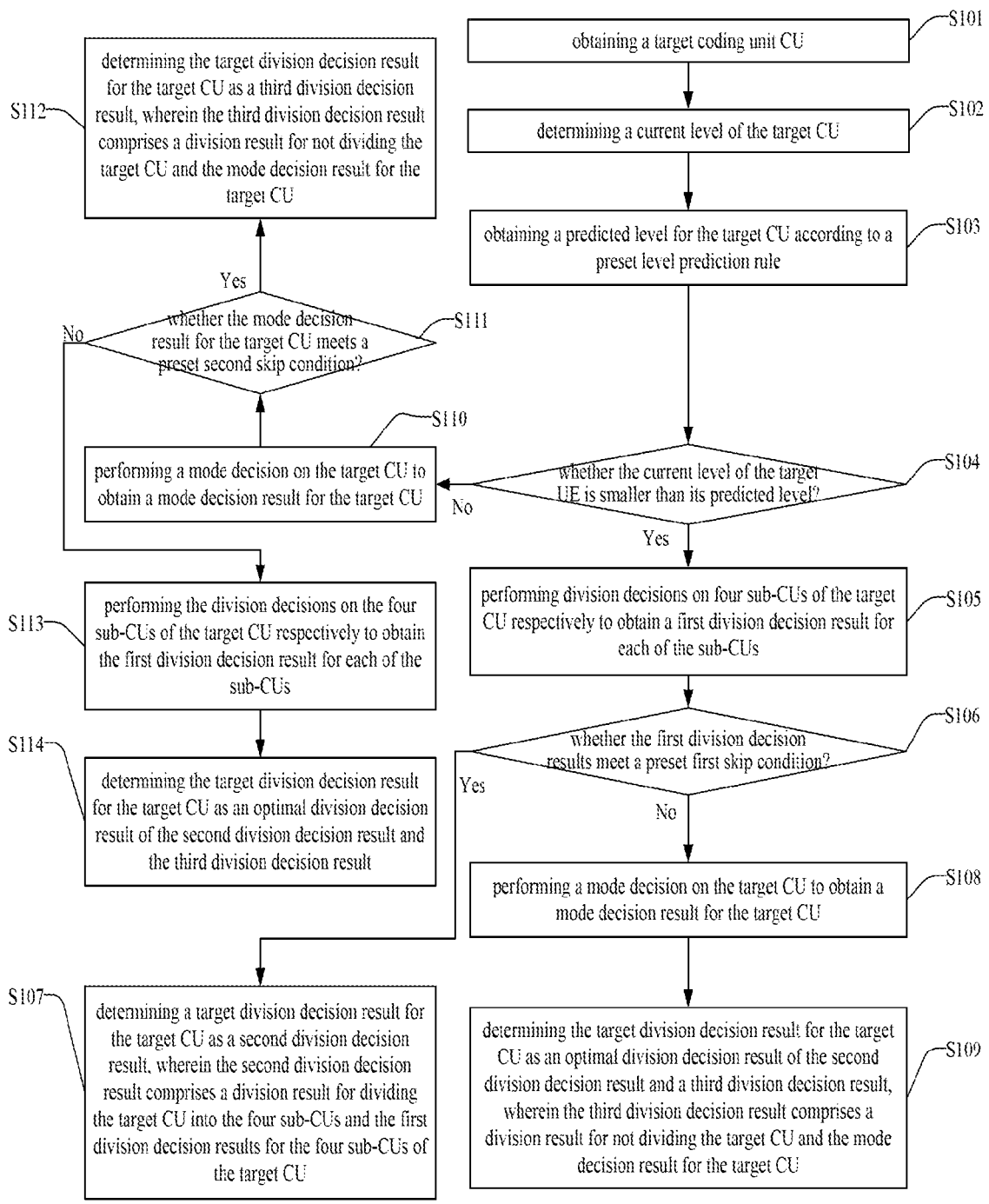
FIG. 6 is a schematic flowchart of a fourth coding unit division decision method provided by an embodiment of the disclosure.

Based on the embodiment shown in FIG. 5, FIG. 6 shows a schematic flowchart of a fourth coding unit division decision method provided by an embodiment of the disclosure. The method may further include the following steps.

At step S113, when the mode decision result for the target CU does not meet the preset second skip condition, the division decisions are respectively performed on the four sub-CUs of the target CU to obtain the first division decision result for each of the sub-CUs.

In a case where the mode decision result for the target coding unit doesn't meet the preset second skip condition, it means that the third division decision result doesn't have a better effect. In such a case, the division decision results for the four sub-coding units of the target coding unit can be taken into consideration. Accordingly, in an embodiment of the disclosure, when it is determined that the mode decision result for the target CU doesn't meet the preset second skip condition, the division decisions are respectively performed on the four sub-CUs of the target CU to obtain the first division decision result for each of the sub-CUs.

In practice, to obtain the first division decision result for each of the sub-CUs, the division decisions may be performed on the four sub-CUs of the target CU by respectively determining the four sub-CUs of the target CU as target CUs according to a preset rule and returning to step S102.

That is, in an embodiment of the disclosure, the step (S113) of performing division decisions on the four sub-CUs of the target CU respectively to obtain the first division decision result for each of the sub-CUs may include:

determining the four sub-CUs of the target CU as target CUs according to the preset rule respectively, and returning to the step of determining the current level of the target CU.

The above preset rule is a rule indicating the sequence in which the division decisions are performed on the four sub-coding units. Considering the reference relations between the neighboring coding units in the coding process, the division decisions have to be performed on the coding units in a specific sequence. The division decisions may be performed in a Z-shape sequence. Consequently, in performing the division decisions on the four sub-coding units of the target coding unit, it determines the four sub-coding units as target coding units one by one sequentially and returns to step S102.

At step S114, the target division decision result for the target CU is determined as the optimal division decision result of the second division decision result and the third division decision result.

It should be noted that a specific implementation of step S114 is the same as that of step S109 in the embodiment of the method shown in FIG. 4. Thus, details for step S114 can be referred to relevant description of step S109 in the embodiment of the method shown in FIG. 4, which will not be repeated herein.

By determining the coding unit K shown in FIG. 2 as an initial target coding unit in the embodiment of the disclosure below, the entire process of the division decision is for example introduced.

Referring to FIG. 2, the initial target coding unit is the coding unit K, and the current level of the coding unit K is 0. The predicted level of the coding unit K is 1, since the level of the left neighboring coding unit E of the coding unit K is 1, the level of the top neighboring coding unit F of the coding unit K is 1. It is known that the current level of the coding unit K is smaller than its predicted level. Thus, division decisions on the four sub-coding units A, B, C, D of the coding unit K can be performed. As shown in FIG. 3, the coding units A, B, C, D are the four sub-coding units of the coding unit K, each of the coding units A, B, C, D thus have a current level of 1.

Based on the sequence described above in which four sub-coding units is used as target coding units, the coding unit A may be first used as a current target coding unit. It is known that the current level of the coding unit A is 1, the level of the left neighboring coding unit E of the coding unit A is 1, and the level of the top neighboring coding unit F of the coding unit A is 1. Thus, the predicted level of the coding unit A is 1. It can be seen that the current level of the target coding unit (the coding unit A) is equal to its predicted level, and thus a mode decision is performed on the coding unit A. The rate-distortion cost corresponding to the coding unit A is calculated to obtain the mode decision result. It is assumed that the rate-distortion cost in the obtained mode decision result is 1500, and the preset threshold is set to 1600. For illustration purpose, the threshold corresponding to the preset first skip condition is called a first threshold, and the threshold corresponding to the preset second skip condition is called a second threshold. It can be seen that the rate-distortion cost in the mode decision result of the coding unit A is smaller than the preset second threshold of 1600. Thus, it is determined that the coding unit A doesn't have to be further divided into four sub-coding units.

At a result, the target division decision result for the coding unit A is determined as including a result composed of the mode decision result for the coding unit A and a decision for not dividing the coding unit A.

Figure 7:
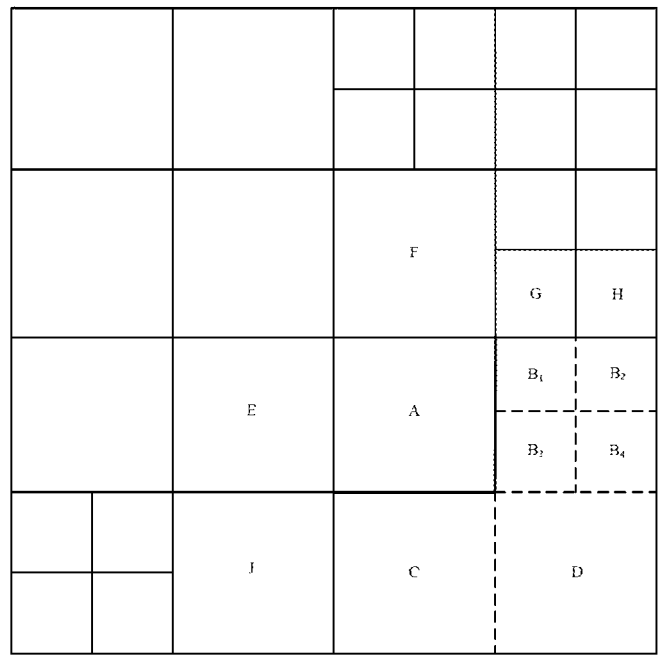
FIG. 7 is a diagram showing the structure of the sub-coding unit B in FIG. 3 based on a division decision.

Referring to FIG. 7, FIG. 7 is a schematic diagram showing the structure of the sub-coding unit B in FIG. 3 according to a division decision. It can be seen from FIG. 7, the coding unit A has a frame shown in solid lines, which represent that the division decision of the coding unit A has been completed. According to the sequence described above in which the four sub-coding units are used as the target coding units, the coding unit B is determined as the target coding unit. The current level of the coding unit B is 1. The level of the left neighboring coding unit A of the coding unit B is 1, and the level of the top neighboring coding unit G of the coding unit B is 2. Thus, the predicted level of the coding unit B is 2. It can be seen, the current level of the target coding unit (the coding unit B) is smaller than its predicted level. Thus, division decisions on the four sub-coding units $B_1$, $B_2$, $B_3$, $B_4$ of the coding unit B can be performed. As shown in FIG. 7, the coding units $B_1$, $B_2$, $B_3$, $B_4$ are four sub-coding units of the coding unit B. Thus, each of the coding units $B_1$, $B_2$, $B_3$, $B_4$ has a current level of 2.

According to the sequence described above in which four sub-coding units are used as target coding units, the coding unit $B_1$ may be first used as a target coding unit. It is known that the current level of the coding unit $B_1$ is 2, the level of the left neighboring coding unit A of the coding unit $B_1$ is 1, and the level of the top neighboring coding unit G of the coding unit $B_1$ is 2. Thus, the predicted level of the coding unit $B_1$. It can be seen that the current level of the target coding unit (the coding unit $B_1$) is equal to its predicted level. Thus, a mode decision is performed on the coding unit $B_1$. The rate-distortion cost corresponding to the coding unit $B_1$ is calculated to obtain the mode decision result. It is assumed that, the rate-distortion cost in the obtained mode decision result is 400. It can be understood that different preset second thresholds may be set for different levels. For example, the preset second threshold is set to 600 in this case. It can be seen that the rate-distortion cost in the mode decision result of the coding unit $B_1$ is smaller than the preset threshold, and thus it can be determined that the coding unit $B_1$ doesn't have to be divided into four sub-coding units.

At a result, the division decision result for the coding unit $B_1$ includes a result composed of the mode decision result for the coding unit $B_1$ and a decision for not dividing coding unit $B_1$.

Figure 8:
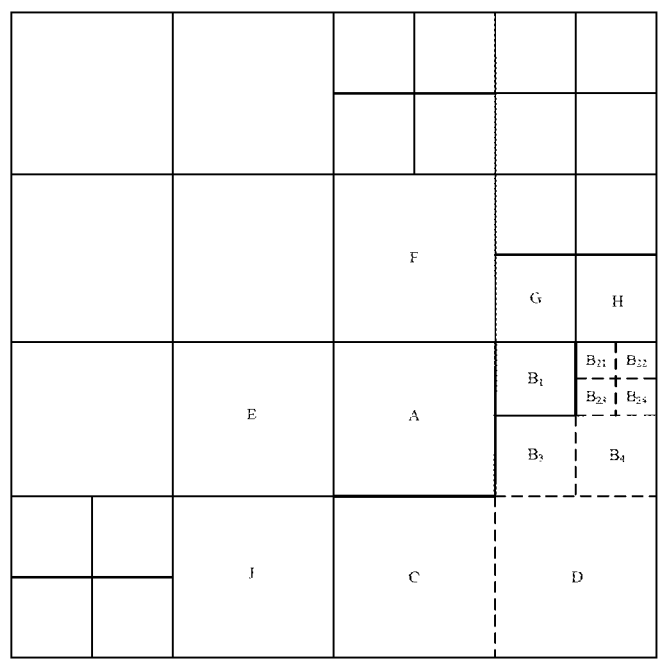
FIG. 8 is a diagram showing the structure of the sub-coding unit $B_2$ in FIG. 7 based on a division decision.

Referring to FIG. 8, FIG. 8 is a schematic diagram showing the structure of the sub-coding unit $B_2$ in FIG. 7 according to a division decision. It can be seen from FIG. 8, the coding unit $B_1$ has a frame shown in solid lines, which represent that the division decision of the coding unit $B_1$ has been completed. According to the sequence described above in which four sub-coding units are used as target coding units, the coding unit $B_2$ may be first used as a target coding unit. The current level of the coding unit $B_2$ is 2. The level of the left neighboring coding unit $B_1$ of the coding unit $B_2$ is 2, and the level of the top neighboring coding unit H of the coding unit $B_2$ is 2. Thus, the predicted level of the coding unit $B_2$ is 2. It can be seen, the current level of the target coding unit (the coding unit $B_2$) is equal to its predicted level. Thus, a mode decision on the coding unit $B_2$ to obtain the mode decision result can be performed. It is assumed that the rate-distortion cost in the obtained mode decision result here is 900, and the preset second threshold is set to 600. It can be seen, the rate-distortion cost in the mode decision result for the coding unit $B_2$ is larger than the preset second threshold. Thus, division decisions on four sub-coding units $B_{21}$, $B_{22}$, $B_{23}$, $B_{24}$ of the coding unit $B_2$ can be performed. As shown in FIG. 8, the coding units $B_{21}$, $B_{22}$, $B_{23}$, $B_{24}$ are the four sub-coding units of the coding unit $B_2$, and thus each of the coding units $B_{21}$, $B_{22}$, $B_{23}$, $B_{24}$ has a current level of 3.

According to the sequence described above in which four sub-coding units are used as target coding units, the coding unit $B_{21}$ may be first used as a target coding unit. It is known that the current level of the coding unit $B_{21}$ is 3, the level of the left neighboring coding unit $B_1$ of the coding unit $B_{21}$ is 2, and the level of the top neighboring coding unit H of the coding unit $B_{21}$ is 2. Thus, the predicted level of the coding unit $B_{21}$ is 2. It can be seen that the current level of the target coding unit (the coding unit $B_{21}$) is smaller than its predicted level. Thus, a mode decision is performed on the coding unit $B_{21}$. The rate-distortion cost corresponding to the coding unit $B_{21}$ is calculated to obtain the mode decision result. It is assumed that the rate-distortion cost in the obtained mode decision result is 200. It can be understood that the current level of the coding unit $B_{21}$ is the maximum value 3, and thus it can be determined that the coding unit $B_{21}$ will be not divided into four sub-coding units.

As a result, the division decision result for the coding unit $B_{21}$ includes a result composed of the mode decision result of the code unit $B_{21}$ and a decision for not dividing the coding unit $B_{21}$.

After determining that the coding unit $B_{21}$ will not be divided into four sub-coding units, according to the sequence described above in which four sub-coding units are used as target coding units, the coding unit $B_{22}$ shown in FIG. 8 is determined as a target coding unit. It is known that the current level of the coding unit $B_{22}$ is 3, the level of the left neighboring coding unit $B_{21}$ of the coding unit $B_{22}$ is 3, and the level of the top neighboring coding unit H of the coding unit $B_{22}$ is 2. Thus, the predicted level of the coding unit $B_{22}$ is 3. It can be seen, the current level of the target coding unit (the coding unit $B_{22}$) is equal to its predicted level. Thus, a mode decision is performed on the coding unit $B_{22}$. The rate-distortion cost corresponding to the coding unit $B_{22}$ is calculated to obtain the mode decision result. It is assumed the rate-distortion cost in the obtained mode decision result is 200. It can be understood that current level of the coding unit $B_{22}$ is the maximum value 3, and thus it can be determined that the coding unit $B_{22}$ will not be divided into four sub-coding units.

As a result, the division decision result for the coding unit $B_{22}$ includes a result composed of the mode decision result for the coding unit $B_{22}$ and a decision for not dividing the coding unit $B_{22}$.

Division decisions are performed on the coding units $B_{23}$ and $B_{24}$ as a target coding unit sequentially. A division decision result for the coding unit $B_{23}$ is obtained, which is assumed as including a result composed of a mode decision result for the coding unit $B_{23}$ and a decision for not dividing the coding unit $B_{23}$. A division decision result for the coding unit $B_{24}$ is obtained, which is assumed as including a result composed of a mode decision result for the coding unit $B_{24}$ and a decision for not dividing the coding unit $B_{24}$.

After performing division decisions on the four sub-coding units $B_{21}$, $B_{22}$, $B_{23}$ and $B_{24}$ of the coding unit $B_2$, it is assumed that the rate-distortion costs in their respective first division decisions are 200, 200, 100 and 200. It can be seen that the sum of the rate-distortion costs in the first division decision results is 700, which is smaller than the rate-distortion cost of 900 in the mode decision result for the coding unit $B_2$. Thus, in this case, it is determined that the division decision result for the coding unit $B_2$ includes the division decision for dividing the coding unit $B_2$ into the four coding units $B_{21}$, $B_{22}$, $B_{23}$, $B_{24}$ and the mode decision results respectively corresponding to the four sub-coding units $B_{21}$, $B_{22}$, $B_{23}$, $B_{24}$.

After determining the division decision result for the coding unit $B_2$, according to the sequence described above in which four sub-coding units are used as target coding units, the coding unit $B_3$ may be determined as a current target coding unit. It is known that the current level of the coding unit $B_3$ is 2, the level of the left neighboring coding unit A of the coding unit $B_3$ is 1, and the level of the top neighboring coding unit $B_1$ of the coding unit $B_3$ is 2. Thus, the predicted level of the coding unit $B_3$ is 2. It can be seen that the current level of the target coding unit (the coding unit $B_3$) is equal to its predicted level. Thus, a mode decision is performed on the coding unit $B_3$. The rate-distortion cost corresponding to the coding unit $B_3$ is calculated to obtain the mode decision result. It is assumed that in this case the rate-distortion cost in the obtained mode decision result is 500, and the preset second threshold is set to 600. It can be seen that the rate-distortion cost in the mode decision result for the coding unit $B_3$ is smaller than the preset threshold, and thus it can be determined that the coding unit $B_3$ doesn't need to be divided into four sub-coding units.

As a result, the division decision result for the coding unit $B_3$ includes a result composed of the mode decision result for the coding unit $B_3$ and a decision for not dividing the coding unit $B_3$.

A mode decision may be performed on the coding unit $B_4$ in a same way as described above, to obtain a mode decision result. It is assumed that the rate-distortion cost in the obtained mode decision result is 500, and the preset second threshold is 600. It can be seen that the rate-distortion cost in the mode decision result for the coding unit $B_4$ is smaller than the preset threshold, and thus it can be determined that the coding unit $B_4$ doesn't need to be divided into four sub-coding units.

As a result, the division decision result for the coding unit $B_4$ includes a result composed of the mode decision result for the coding unit $B_4$ and a decision for not dividing the coding unit $B_4$.

In summary, the rate-distortion cost in the second division result for the coding unit B is 400+(200+200+100+200)+500+500=2100. It is assumed that the corresponding preset first threshold is 2500. Since 2100 is smaller than 2500, the target division decision result for the coding unit B can be determined as this second division decision result. That is, the target division decision result for the coding unit B includes: the division decision result for dividing the coding unit B into $B_1$, $B_{21}$, $B_{22}$, $B_{23}$, $B_{24}$, $B_3$, and $B_4$, and the mode decision results respectively corresponding to the coding units $B_1$, $B_{21}$, $B_{22}$, $B_{23}$, $B_{24}$, $B_3$, and $B_4$.

After determining the division decision result for the coding unit B, according to the sequence described above in which four sub-coding units are used as target coding units, the coding unit C may be determined as a current target coding unit. It is known that the current level of the coding unit C is 1, the level of the left neighboring coding unit J of the coding unit C is 1, and the level of the top neighboring coding unit A of the coding unit C is 1. Thus, the predicted level of the coding unit C is 1. It can be seen that the current level of the target coding unit (the coding unit C) is equal to its predicted level, and thus a mode decision is performed on the coding unit C. The rate-distortion cost corresponding to the coding unit C is calculated to obtain the mode decision result. It is assumed the rate-distortion cost in the obtained mode decision result is 1600, and the preset second threshold in this case is set to 1600. It can be seen that the rate-distortion cost in the mode decision result for the coding unit C is equal to the preset second threshold, and thus it can be determined that the coding unit C does not need to be divided into four sub-coding units.

As a result, the division decision result for the coding unit C includes a result composed of the mode decision result for the coding unit C and a decision for not dividing the coding unit C.

Figure 9:
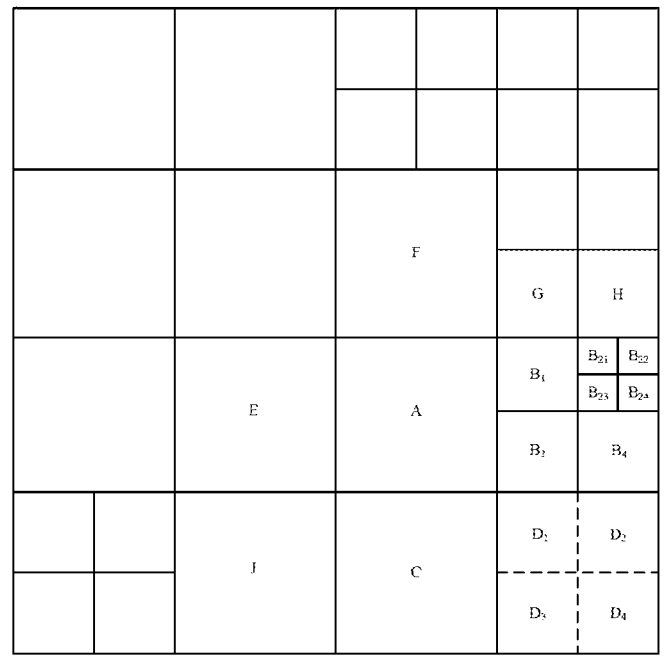
FIG. 9 is a diagram showing the structure of the sub-coding unit D in FIG. 7 based on a division decision.

At last, according to the sequence described above in which four sub-coding units are used as target coding units, the coding unit D may be determined as a target coding unit. It is known that the current level of the coding unit D is 1, the level of the left neighboring coding unit C of the coding unit D is 1, and the level of the top neighboring coding unit $B_{23}$ of the coding unit D is 2. Thus, the predicted level of the coding unit D is 2. It can be seen that the current level of the target coding unit (the coding unit D) is smaller than its predicted level, and thus division decisions are performed respectively on the four sub-coding units $D_1$, $D_2$, $D_3$, $D_4$ of the coding unit D. As shown in FIG. 9, a schematic diagram showing the structure the sub-coding unit D in FIG. 7 according to a division decision. Since the coding units $D_1$, $D_2$, $D_3$, $D_4$ are the four sub-coding units of the coding unit D, each of the coding units $D_1$, $D_2$, $D_3$, $D_4$ has a current level of 2.

With steps similar as the steps for the four sub-coding units of the coding unit B, division decision results respectively corresponding to the four sub-coding units $D_1$, $D_2$, $D_3$, $D_4$ of the coding unit D can be easily obtained. It is assumed that the rate-distortion cost results in the mode decision results for the four sub-coding units $D_1$, $D_2$, $D_3$, $D_4$ of the coding unit D obtained based on the division decision process described above are 500, 600, 300, 400 respectively. All these results are smaller than or equal to the preset second threshold 600, and thus it can be determined that the coding units $D_1$, $D_2$, $D_3$, $D_4$ each does not need to be divided into four sub-coding units.

As a result, the target division decision result for the coding unit D includes the division result for dividing the coding unit D into $D_1$, $D_2$, $D_3$, and $D_4$ and mode decision results respectively corresponding to the coding units $D_1$, $D_2$, $D_3$, and $D_4$.

In summary, the division decision results for the four sub-coding units A, B, C, D of the initial coding unit K are obtained, in which the rate-distortion costs are respectively 1500, 400+(200+200+100+200)+500+500, 1600, 500+600+300+400 respectively, that is, 1500, 2100, 1600, and 1800.

Figure 10:
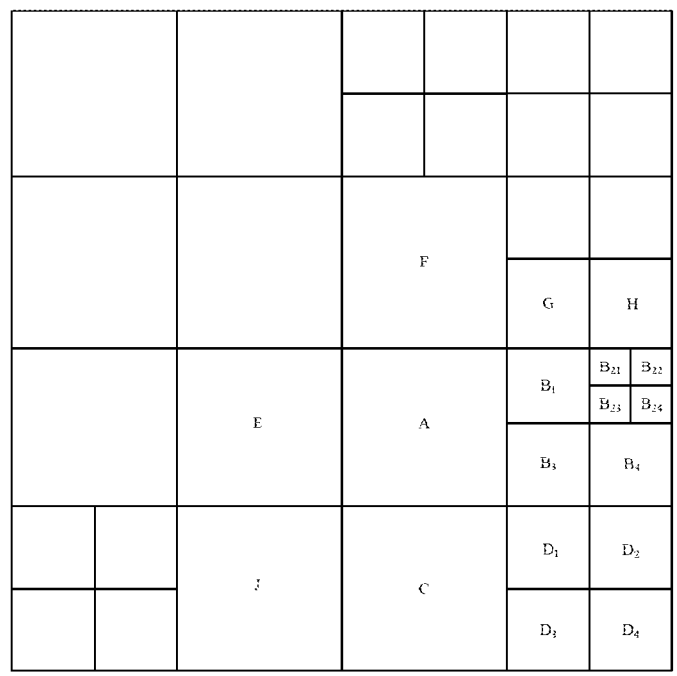
FIG. 10 is a diagram showing the structure of the coding unit K in FIG. 2 based on a division decision result obtained by performing a division decision.

It is assumed that the preset first threshold is 6500. The sum of the rate-distortion costs in the obtained first division decision results for the four sub-coding units A, B, C, D of the target coding unit K is 7000, which doesn't meet the first skip condition. At this point, a mode decision should be performed on the coding unit K. It is assumed that the rate-distortion cost in the mode decision result obtained by performing the mode decision on the coding unit K is 8000. By comparison, the sum of the rate-distortion costs in the first division decision results for the four sub-coding units A, B, C, D of the target coding unit K is smaller than the rate-distortion cost in the mode decision result for the coding unit K. Thus, the division decision result for the initial target coding unit (the coding unit K) may be determined in the end, as shown in FIG. 10. FIG. 10 is a schematic diagram showing the structure of on the coding unit K in FIG. 2 according to the division decision result obtained by performing the division decision.

That is, the target division decision result for the coding unit K includes: the division result for dividing the coding unit K into A, $B_1$, $B_{21}$, $B_{22}$, $B_{23}$, $B_{24}$, $B_3$, $B_4$, C, $D_1$, $D_2$, $D_3$, and $D_4$, and the mode decision results respectively corresponding to the coding units A, $B_1$, $B_{21}$, $B_{22}$, $B_{23}$, $B_{24}$, $B_3$, $B_4$, C, $D_1$, $D_2$, $D_3$, and $D_4$.

It should be noted, a brief description is given to steps that are similar to other steps described above, and relevant details can be known with reference to the description of the other steps. Of course, the above process is an example of a specific division decision process of the embodiment of the disclosure, which is only an example and the disclosure is not limited thereto.

In the embodiment shown in FIG. 6, the current level of the target CU is determined and a predicted level of the target CU is obtained according to the preset level prediction rule. A manner of performing the division decision is determined by comparing the current level and the predicted level, to obtain the division decision result. Further, it is determined in advance, according to the preset skip condition, whether the division decision on the current target coding unit is to be finished in advance to obtain the division decision result for the target coding unit. This reduces the computation amount and further improves the coding speed.

Figure 11:
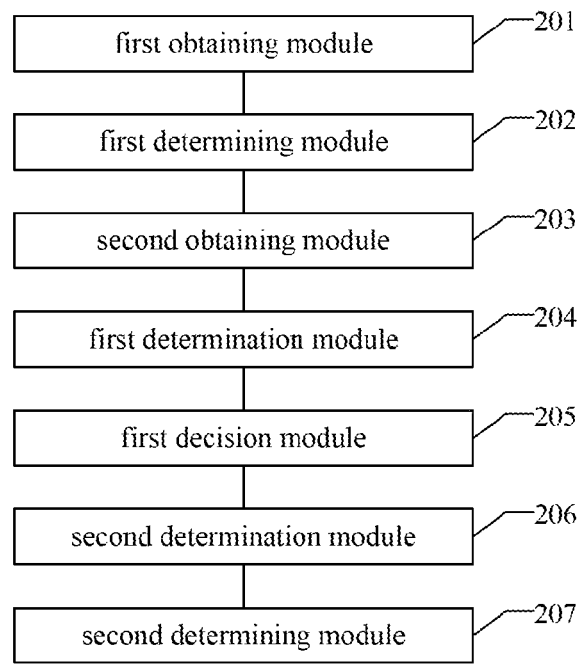
FIG. 11 is a diagram showing the structure of a first coding unit division decision device provided by an embodiment of the disclosure.

Corresponding to the embodiment of the method shown in FIG. 1, an embodiment of the disclosure provides a first coding unit division decision device. As shown in FIG. 11, the device includes:

a first obtaining module 201 configured for obtaining a target coding unit CU;

a first determining module 202 configured for determining a current level of the target CU;

a second obtaining module 203 configured for obtaining a predicted level of the target CU according to a preset level prediction rule;

a first determination module 204 configured for determining whether the current level is smaller than the predicted level;

a first decision module 205 configured for, when a determining result from the first determination module is that the current level is smaller than the predicted level, performing division decisions on four sub-CUs of the target CU respectively to obtain a first division decision result for each of the sub-CUs;

a second determination module 206 configured for determining whether the first division decision results meet a preset first skip condition; and a second determining module 207 configured for, when a determining result from the second determination module is that the first division decision results meet the preset first skip condition, determining a target division decision result for the target CU as a second division decision result, wherein the second division decision result comprises a division result for dividing the target CU into the four sub-CUs and the first division decision results for the four sub-CUs of the target CU.

Optionally, in practice, the second obtaining module 203 may be configured for:

determining whether a level of a left neighboring CU of the target CU and a level of a top neighboring CU of the target CU are known, in case of the level of the left neighboring CU being known and the level of the top neighboring CU being unknown, determining the predicted level of the target CU as the level of the left neighboring CU;

in case of the level of the top neighboring CU being known and the level of the left neighboring CU being unknown, determining the predicted level of the target CU as the level of the top neighboring CU;

in case of the level of the left neighboring CU and the level of the top neighboring CU being known, determining the predicted level of the target CU as a highest level of the level of the left neighboring CU and the level of the top neighboring CU;

in case of the level of the left neighboring CU and the level of the top neighboring CU being unknown, determining the predicted level of the target CU as a level of a reference CU, wherein when the reference CU is not available, determining the predicted level of the target CU as 0, wherein the reference CU comprises a CU in a previous video frame before a video frame where the target CU is located, and a position of the CU in the previous video frame is the same as a position of the target CU in the video frame.

In the embodiment shown in FIG. 11, the predicted level of the target CU is proposed, and the division decision is determined by comparing the current level and the predicted level to obtain the first division decision results. In the case where the first division decision results meet the preset first skip condition, the target division decision result for the target CU is directly determined without performing a mode decision on the target CU, which reduces the computation amount and thus improves the encoding speed.

Figure 12:
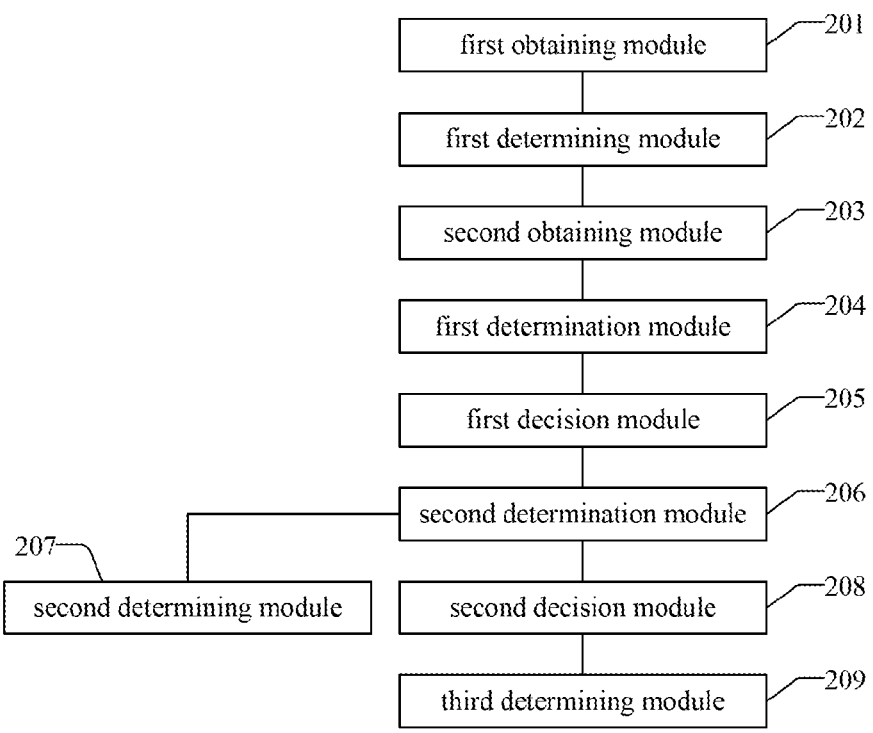
FIG. 12 is a diagram showing the structure of a second coding unit division decision device provided by an embodiment of the disclosure.

Corresponding to the embodiment of the method shown in FIG. 4 and based on the embodiment shown in FIG. 11, an embodiment of the disclosure provides a second coding unit division decision device. As shown in FIG. 12, the device may further include:

a second decision module 208 configured for, when the determining result from the second determination module 206 is that the first division decision results do not meet the preset first skip condition, performing a mode decision on the target CU to obtain a mode decision result for the target CU; and a third determining module 209 configured for determining the target division decision result for the target CU as an optimal division decision result of the second division decision result and a third division decision result, wherein the third division decision result comprises a division result for not dividing the target CU and the mode decision result for the target CU.

As an optional implementation of the embodiment of the disclosure, the third determining module may be configured for:

determining whether a rate-distortion cost in the second division decision result is smaller than or equal to a rate-distortion cost in the third division decision result;

in case of the rate-distortion cost in the second division decision result smaller than or equal to the rate-distortion cost in the third division decision result, determining the target division decision result for the target CU as the second division decision result; and in case of the rate-distortion cost in the second division decision result not smaller than and not equal to the rate-distortion cost in the third division decision result, determining the target division decision result for the target CU as the third division decision result.

In the embodiment shown in FIG. 12, when the first division decision results do not meet the preset first skip condition, the mode decision is performed on the target coding unit to obtain the mode decision result for the target coding unit. Then the optimal division decision result is selected from the second division decision result and the third division decision result and determined as the target division decision result for the target coding unit. This improves the accuracy of the division decision.

Figure 13:
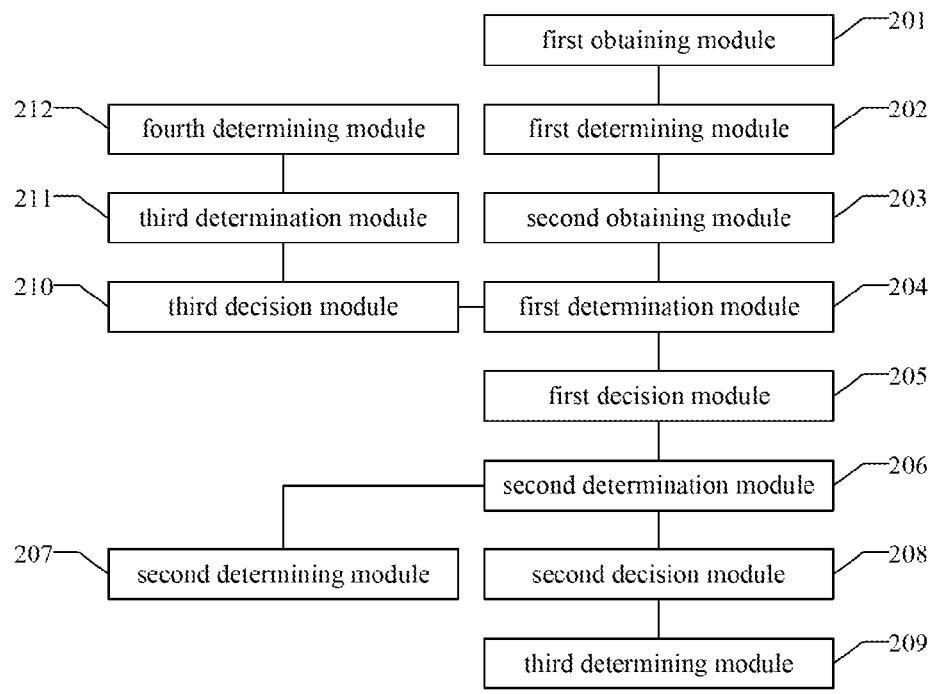
FIG. 13 is a diagram showing the structure of a third coding unit division decision device provided by an embodiment of the disclosure.

Corresponding to the embodiment of the method shown in FIG. 5 and based on the embodiment shown in FIG. 12, an embodiment of the disclosure provides a third coding unit division decision device. As shown in FIG. 13, the device may further include: a third decision module 210, a third determination module 211, and a fourth determining module 212.

The third decision module 210 is configured for when the determining result from the first determination module 204 is that the current level is not smaller than the predicted level, performing a mode decision on the target CU to obtain a mode decision result for the target CU.

In practice, the third decision module 210 may be configured for:

calculating a rate-distortion cost for the target CU to obtain the mode decision result for the target CU.

The third determination module 211 is configured for determining whether the mode decision result for the target CU meets a preset second skip condition.

The fourth determining module 212 is configured for, when a determining result from the third determination module 211 is that the mode decision result for the target CU meets the preset second skip condition, determining the target division decision result for the target CU as the third division decision result, wherein the third division decision result comprises the division result for not dividing the target CU and the mode decision result for the target CU.

Applying the embodiment of the disclosure, the computation amount for the division decision can be reduced and thus the encoding speed is improved.

Corresponding to the embodiment of the method shown in FIG. 6 and based on the embodiment shown in FIG. 13, the embodiment of the disclosure provides a fourth coding unit division decision device. As shown as FIG. 14, the device may further include a fourth decision module 213.

The fourth decision module 213 is configured for, when the determining result from the third determination module 211 is that the mode decision result for the target CU does not meet the preset second skip condition, performing the division decisions on the four sub-CUs of the target CU respectively to obtain the first division decision result for each of the sub-CUs.

In practice, the fourth decision module 213 may be configured for:

determining the four sub-CUs of the target CU as target CUs according to a preset rule and triggering the first determining module 202.

The fifth determining module 214 is configured for determining the target division decision result for the target CU as the optimal division decision result of the second division decision result and the third division decision result.

As an optional implementation based on the embodiment of the disclosure, the fifth determining module 214 may be configured for:

determining whether a rate-distortion cost in the second division decision result is smaller than or equal to a rate-distortion cost in the third division decision result;

in case of the rate-distortion cost in the second division decision result smaller than or equal to the rate-distortion cost in the third division decision result, determining the target division decision result for the target CU as the second division decision result; and in case of the rate-distortion cost in the second division decision result not smaller than and not equal to the rate-distortion cost in the third division decision result, determining the target division decision result for the target CU as the third division decision result.

Figure 14:
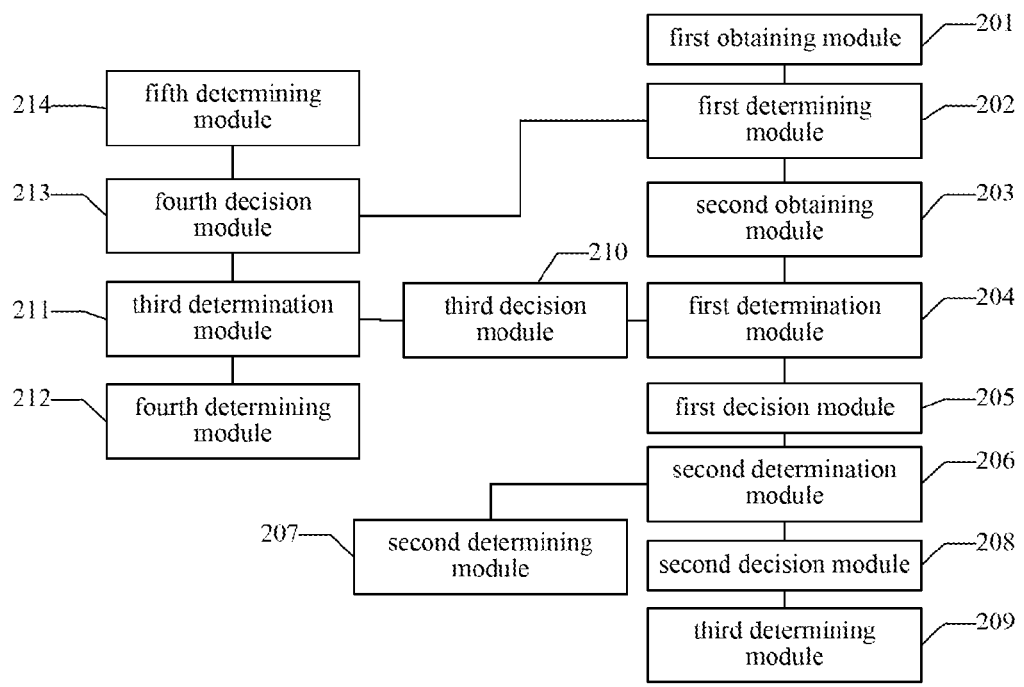
FIG. 14 is a diagram showing the structure of a fourth coding unit division decision device provided by an embodiment of the disclosure.
Figure 15:
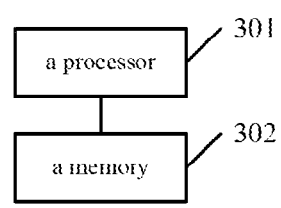
FIG. 15 is a diagram showing the structure of an encoder provided by an embodiment of the disclosure.

In the embodiment shown in FIG. 14, the current level of the target CU is determined and a predicted level of the target CU is obtained according to the preset level prediction rule. A manner of performing the division decision is determined by comparing the current level and the predicted level, to obtain the division decision result. Further, it is determined in advance, according to the preset skip condition, whether the division decision on the current target coding unit is to be finished in advance to obtain the division decision result for the target coding unit. This reduces the computation amount and further improves the coding speed.

An embodiment of the disclosure further provides an encoder. In addition to the encoder having the same functions as existing encoders, the encoder also applies any of the coding unit division decision devices shown in FIGS. 11-14. Therefore, the encoder provided by the embodiment of the disclosure can achieve the same effect as the embodiments of devices shown in FIGS. 11-14. Thus, the encoder will not be described in detail herein, and the same content may refer to corresponding parts above.

In the solution of the embodiment, the predicted level of the target CU is proposed, and the division decision is determined by comparing the current level and the predicted level to obtain the first division decision results. In the case where the first division decision results meet the preset first skip condition, the target division decision result for the target CU is directly determined without performing a mode decision on the target CU, which reduces the computation amount and thus improves the encoding speed.

An embodiment of the disclosure further provides an encoder, as shown in FIG. 6, including a processor 301 and a memory 302.

The memory 302 is configured for storing a computer program.

The processor 301 is configured for, when executing the computer program stored in the memory 302, implementing operations including:

obtaining a target coding unit (CU);

determining a current level of the target CU;

obtaining a predicted level of the target CU according to a preset level prediction rule;

determining whether the current level is smaller than the predicted level;

in case of the current level smaller than the predicted level, performing division decisions on four sub-CUs of the target CU respectively to obtain a first division decision result for each of the sub-CUs;

determining whether the first division decision results meet a preset first skip condition; and in case of the first division decision results meeting the preset first skip condition, determining a target division decision result for the target CU as a second division decision result, wherein the second division decision result comprises a division result for dividing the target CU into the four sub-CUs and the first division decision results for the four sub-CUs of the target CU.

The specific implementation and related explanations regarding each of the steps of the operations may refer to the embodiments of the method shown in FIG. 1, FIG. 4, FIG. 5 and FIG. 6, which will not be repeated here.

The encoder may be provided with a communication interface that enables the communication between the encoder and other devices.

The processor 301, the communication interface and the memory 302 communicate with each other through a communication bus. The communication bus mentioned here may be a Peripheral Component Interconnect (PCI) bus or an Extended Industry Standard Architecture (EISA) bus. The communication bus can be classified into an address bus, a data bus, a control bus, and the like.

The memory 302 may include a Random Access Memory (RAM), and may also include a Non-Volatile Memory (NVM), such as at least one disk memory. Optionally, the memory may also be at least one storage device located far from the processor.

The processor 301 may be a general-purpose processor, including a Central Processing Unit (CPU), a Network Processor (NP), and the like; it may also be a Digital Signal Processor (DSP), an Application Specific Integrated Circuit (ASIC), a Field-Programmable Gate Array (FPGA), or other programmable logic devices, discrete gate or transistor logic devices, and discrete hardware components.

It is known from above, in the solution provided by the embodiment, the predicted level of the target CU is proposed, and the division decision is determined by comparing the current level and the predicted level to obtain the first division decision results. In the case where the first division decision results meet the preset first skip condition, the target division decision result for the target CU is directly determined without performing a mode decision on the target CU, which reduces the computation amount and thus improves the encoding speed.

Another embodiment of the disclosure further provides a computer-readable storage medium having stored thereon instructions that, when executed on a computer, cause the computer to carry out any of the coding units division decision methods in the above embodiments.

It is known from above, in the solution provided by the embodiment, the predicted level of the target CU is proposed, and the division decision is determined by comparing the current level and the predicted level to obtain the first division decision results. In the case where the first division decision results meet the preset first skip condition, the target division decision result for the target CU is directly determined without performing a mode decision on the target CU, which reduces the computation amount and thus improves the encoding speed.

Another embodiment of the disclosure further provides a computer program product comprising instructions which, when executed on a computer, causes the computer to carry out the steps of any of the above coding unit division decision methods.

It is known from above, in the solution provided by the embodiment, the predicted level of the target CU is proposed, and the division decision is determined by comparing the current level and the predicted level to obtain the first division decision results. In the case where the first division decision results meet the preset first skip condition, the target division decision result for the target CU is directly determined without performing a mode decision on the target CU, which reduces the computation amount and thus improves the encoding speed.

Another embodiment of the disclosure further provides a computer program that, when executed on a computer, causes the computer to carry out the steps of any of the above coding unit division decision methods.

It is known from above, in the solution provided by the embodiment, the predicted level of the target CU is proposed, and the division decision is determined by comparing the current level and the predicted level to obtain the first division decision results. In the case where the first division decision results meet the preset first skip condition, the target division decision result for the target CU is directly determined without performing a mode decision on the target CU, which reduces the computation amount and thus improves the encoding speed.

It should be noted that the relationship terms used herein, such as "first", "second", and the like are only used to distinguish one entity or operation from another entity or operation, but do not necessarily require or imply that there is actual relationship or order between these entities or operations. Moreover, the terms "include", "include", or any variants thereof are intended to cover a non-exclusive inclusion, such that processes, methods, articles, or devices, including a series of elements, include not only those elements that have been listed, but also other elements that have not been listed or the elements intrinsic to these processes, methods, articles, or devices. Without further limitations, elements limited by the wording "include(s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the device, encoder, computer-readable medium, computer program product containing instructions and computer program are described briefly, since they are substantially similar to the embodiment of the method, and the related contents can refer to the description of the embodiment of the method.

The embodiments described above are simply preferable embodiments of the disclosure, and are not intended to limit the scope of protection of the disclosure. Any modifications, alternatives, improvements, or the like within the spirit and principle of the disclosure shall be included within the scope of protection of the disclosure.

An embodiment of the disclosure provides a coding unit division decision method. The method includes:
obtaining a target coding unit (CU);
determining a current level of the target CU;
obtaining a predicted level of the target CU according to a preset level prediction rule;
determining whether the current level is smaller than the predicted level;
in case of the current level smaller than the predicted level, performing division decisions on four sub-CUs of the target CU respectively to obtain a first division decision result for each of the sub-CUs;
determining whether the first division decision results meet a preset first skip condition; and
in case of the first division decision results meeting the preset first skip condition, determining a target division decision result for the target CU as a second division decision result, wherein the second division decision result comprises a division result for dividing the target CU into the four sub-CUs and the first division decision results for the four sub-CUs of the target CU.

Optionally, when the first division decision results do not meet the preset first skip condition, the method further comprises:
performing a mode decision on the target CU to obtain a mode decision result for the target CU; and
determining the target division decision result for the target CU as an optimal division decision result of the second division decision result and a third division decision result, wherein the third division decision result comprises a division result for not dividing the target CU and the mode decision result for the target CU.

Optionally, determining the target division decision result for the target CU as an optimal division decision result of the second division decision result and a third division decision result comprises:
determining whether a rate-distortion cost in the second division decision result is smaller than or equal to a rate-distortion cost in the third division decision result;
in case of the rate-distortion cost in the second division decision result smaller than or equal to the rate-distortion cost in the third division decision result, determining the target division decision result for the target CU as the second division decision result; and
in case of the rate-distortion cost in the second division decision result not smaller than and not equal to the rate-distortion cost in the third division decision result, determining the target division decision result for the target CU as the third division decision result.

Optionally, when the current level is not smaller than the predicted level, the method further comprises:
performing a mode decision on the target CU to obtain a mode decision result for the target CU;
determining whether the mode decision result for the target CU meets a preset second skip condition; and
in case of the mode decision result for the target CU meeting the preset second skip condition, determining the target division decision result for the target CU as a third division decision result, wherein the third division decision result comprises a division result for not dividing the target CU and the mode decision result for the target CU.

Optionally, performing a mode decision on the target CU to obtain a mode decision result for the target CU comprises:
calculating a rate-distortion cost for the target CU to obtain the mode decision result for the target CU.

Optionally, when the mode decision result for the target CU does not meet the preset second skip condition, the method further comprises:
performing the division decisions on the four sub-CUs of the target CU respectively to obtain the first division decision result for each of the sub-CUs; and determining the target division decision result for the target CU as an optimal division decision result of the second division decision result and the third division decision result.

Optionally, performing the division decisions on the four sub-CUs of the target CU respectively to obtain the first division decision result for each of the sub-CUs comprises:

determining the four sub-CUs of the target CU as target CUs respectively according to a preset rule and returning to the step of determining a current level of the target CU.

Optionally, obtaining a predicted level of the target CU according to a preset level prediction rule comprises:

determining whether a level of a left neighboring CU of the target CU and a level of a top neighboring CU of the target CU are known, in case of the level of the left neighboring CU being known and the level of the top neighboring CU being unknown, determining the predicted level of the target CU as the level of the left neighboring CU;

in case of the level of the top neighboring CU being known and the level of the left neighboring CU is unknown, determining the predicted level of the target CU as the level of the top neighboring CU;

in case of the level of the left neighboring CU and the level of the top neighboring CU being known, determining the predicted level of the target CU as a highest level of the level of the left neighboring CU and the level of the top neighboring CU;

in case of the level of the left neighboring CU and the level of the top neighboring CU being unknown, determining the predicted level of the target CU as a level of a reference CU, wherein when the reference CU is not available, determining the predicted level of the target CU as 0, wherein the reference CU comprises a CU in a previous video frame before a video frame where the target CU is located, and a position of the CU in the previous video frame is the same as a position of the target CU in the video frame.

An embodiment of the disclosure provides a coding unit division decision device, which includes:

a first obtaining module configured for obtaining a target coding unit (CU);

a first determining module configured for determining a current level of the target CU;

a second obtaining module configured for obtaining a predicted level of the target CU according to a preset level prediction rule;

a first determination module configured for determining whether the current level is smaller than the predicted level;

a first decision module configured for, when a determining result from the first determination module is that the current level is smaller than the predicted level, performing division decisions on four sub-CUs of the target CU respectively to obtain a first division decision result for each of the sub-CUs;

a second determination module configured for determining whether the first division decision results meet a preset first skip condition; and a second determining module configured for, when a determining result from the second determination module is that the first division decision results meet the preset first skip condition, determining a target division decision result for the target CU as a second division decision result, wherein the second division decision result comprises a division result for dividing the target CU into the four sub-CUs and the first division decision results for the four sub-CUs of the target CU.

Optionally, the device further includes:

a second decision module configured for, when the determining result from the second determination module is that the first division decision results do not meet the preset first skip condition, performing a mode decision on the target CU to obtain a mode decision result for the target CU; and a third determining module configured for determining the target division decision result for the target CU as an optimal division decision result of the second division decision result and a third division decision result, wherein the third division decision result comprises a division result for not dividing the target CU and the mode decision result for the target CU.

Optionally, the third determining module is further configured for:

determining whether a rate-distortion cost in the second division decision result is smaller than or equal to a rate-distortion cost in the third division decision result;

in case of the rate-distortion cost in the second division decision result smaller than or equal to the rate-distortion cost in the third division decision result, determining the target division decision result for the target CU as the second division decision result; and in case of the rate-distortion cost in the second division decision result not smaller than and not equal to the rate-distortion cost in the third division decision result, determining the target division decision result for the target CU as the third division decision result.

Optionally, the device further includes:

a third decision module configured for, when the determining result from the first determination module is that the current level is not smaller than the predicted level, performing a mode decision on the target CU to obtain a mode decision result for the target CU;

a third determination module configured for determining whether the mode decision result for the target CU meets a preset second skip condition; and a fourth determining module configured for, when a determining result from the third determination module is that the mode decision result for the target CU meets the preset second skip condition, determining the target division decision result for the target CU as the third division decision result, wherein the third division decision result comprises the division result for not dividing the target CU and the mode decision result for the target CU.

Optionally, the third decision module is further configured for:

when the determining result from the first determination module is that the current level is not smaller than the predicted level, calculating a rate-distortion cost for the target CU to obtain the mode decision result for the target CU.

Optionally, the device further includes:

a fourth decision module configured for, when the determining result from the third determination module is that the mode decision result for the target CU does not meet the preset second skip condition, performing the division decisions on the four sub-CUs of the target CU respectively to obtain the first division decision result for each of the sub-CUs; and a fifth determining module configured for determining the target division decision result for the target CU as the optimal division decision result of the second division decision result and the third division decision result.

Optionally, the fourth decision module is further configured for:

when the determining result from the third determination module is that the mode decision result for the target CU does not meet the preset second skip condition, determining the four sub-CUs of the target CU as target CUs according to a preset rule and triggering the first determining module.

Optionally, the second obtaining module is further configured for:

determining whether a level of a left neighboring CU of the target CU and a level of a top neighboring CU of the target CU are known, in case of the level of the left neighboring CU being known and the level of the top neighboring CU being unknown, determining the predicted level of the target CU as the level of the left neighboring CU;

in case of the level of the top neighboring CU being known and the level of the left neighboring CU being unknown, determining the predicted level of the target CU as the level of the top neighboring CU;

in case of the level of the left neighboring CU and the level of the top neighboring CU being known, determining the predicted level of the target CU as a highest level of the level of the left neighboring CU and the level of the top neighboring CU;

in case of the level of the left neighboring CU and the level of the top neighboring CU being unknown, determining the predicted level of the target CU as a level of a reference CU, wherein when the reference CU is not available, determining the predicted level of the target CU as 0, wherein the reference CU comprises a CU in a previous video frame before a video frame where the target CU is located, and a position of the CU in the previous video frame is the same as a position of the target CU in the video frame.

An embodiment of the disclosure further provides an encoder applying any of the coding unit division decision devices above.

An embodiment of the disclosure further provides an encoder including a processor and a memory; wherein the memory is configured for storing a computer program; and the processor is configured for, when executing the computer program stored in the memory, implementing steps of any of the coding unit division decision methods above.

An embodiment of the disclosure further provides a computer-readable storage medium having stored thereon a computer program that, when executed by a processor, causes the processor to carry out the steps of any of the coding unit division decision methods above.

An embodiment of the disclosure further provides a computer program product containing instructions which, when executed on a computer, causes the computer to carry out the steps of any of the coding unit division decision methods above.

An embodiment of the disclosure further provides a computer program that, when executed on a computer, causes the computer to carry out the steps of any of the coding unit division decision methods above.

It can be seen from the above, in the solutions provided by the embodiments of the disclosure, the current level of the target CU is determined and a predicted level of the target CU is obtained according to a preset level prediction rule. A determination is made as to whether the current level is smaller than the predicted level. In case of the current level smaller than the predicted level, division decisions will be performed on four sub-CUs of the target CU to obtain a first division decision result for each of the sub-CUs. In case of the first division decision results meeting a preset first skip condition, a target division decision result for the target CU is determined as a second division decision result that includes a division result for dividing the target CU into four sub-CUs and the first division decision results respectively corresponding to the four sub-CUs of the target CU.

In the embodiments of the disclosure, the predicted level of the target CU is proposed, and the division decision is determined by comparing the current level and the predicted level to obtain the first division decision results. In the case where the first division decision results meet the preset first skip condition, the target division decision result for the target CU is directly determined without performing a mode decision on the target CU, which reduces the computation amount and thus improves the encoding speed.

The invention claimed is:

1. A coding unit division decision method, comprising:
   obtaining a target coding unit (CU);
   determining a current level of the target CU;
   obtaining a predicted level of the target CU according to a preset level prediction rule;
   determining whether the current level is smaller than the predicted level;
   in case of the current level smaller than the predicted level, performing division decisions on four sub-CUs of the target CU respectively to obtain a first division decision result for each of the sub-CUs;
   determining whether the first division decision results meet a preset first skip condition; and
   in case of the first division decision results meeting the preset first skip condition, determining a target division decision result for the target CU as a second division decision result, wherein the second division decision result comprises a division result for dividing the target CU into the four sub-CUs and the first division decision results for the four sub-CUs of the target CU,
   wherein obtaining a predicted level of the target CU according to a preset level prediction rule comprises:
   determining whether a level of a left neighboring CU of the target CU and a level of a top neighboring CU of the target CU are known,
   in case of the level of the left neighboring CU being known and the level of the top neighboring CU being unknown, determining the predicted level of the target CU as the level of the left neighboring CU,
   in case of the level of the top neighboring CU being known and the level of the left neighboring CU being unknown, determining the predicted level of the target CU as the level of the top neighboring CU,
   in case of the level of the left neighboring CU and the level of the top neighboring CU being known, determining the predicted level of the target CU as a highest level of the level of the left neighboring CU and the level of the top neighboring CU, and
   in case of the level of the left neighboring CU and the level of the top neighboring CU being unknown, determining the predicted level of the target CU as a level of a reference CU, wherein when the reference CU is not available, determining the predicted level of the target CU as 0, wherein the reference CU comprises a CU in a previous video frame before a video frame where the target CU is located, and a position of the CU in the previous video frame is the same as a position of the target CU in the video frame.

2. The method of claim 1, wherein when the first division decision results do not meet the preset first skip condition, the method further comprises:

performing a mode decision on the target CU to obtain a mode decision result for the target CU; and determining the target division decision result for the target CU as an optimal division decision result of the second division decision result and a third division decision result, wherein the third division decision result comprises a division result for not dividing the target CU and the mode decision result for the target CU.

3. The method of claim 2, wherein determining the target division decision result for the target CU as an optimal division decision result of the second division decision result and a third division decision result comprises:

determining whether a rate-distortion cost in the second division decision result is smaller than or equal to a rate-distortion cost in the third division decision result;

in case of the rate-distortion cost in the second division decision result smaller than or equal to the rate-distortion cost in the third division decision result, determining the target division decision result for the target CU as the second division decision result; and in case of the rate-distortion cost in the second division decision result not smaller than and not equal to the rate-distortion cost in the third division decision result, determining the target division decision result for the target CU as the third division decision result.

4. The method of claim 1, wherein when the current level is not smaller than the predicted level, the method further comprises:

performing a mode decision on the target CU to obtain a mode decision result for the target CU;

determining whether the mode decision result for the target CU meets a preset second skip condition; and in case of the mode decision result for the target CU meeting the preset second skip condition, determining the target division decision result for the target CU as a third division decision result, wherein the third division decision result comprises a division result for not dividing the target CU and the mode decision result for the target CU.

5. The method of claim 2, wherein performing a mode decision on the target CU to obtain a mode decision result for the target CU comprises:

calculating a rate-distortion cost for the target CU to obtain the mode decision result for the target CU.

6. The method of claim 4, wherein when the mode decision result for the target CU does not meet the preset second skip condition, the method further comprises:

performing the division decisions on the four sub-CUs of the target CU respectively to obtain the first division decision result for each of the sub-CUs; and determining the target division decision result for the target CU as an optimal division decision result of the second division decision result and the third division decision result.

7. The method of claim 1, wherein performing the division decisions on the four sub-CUs of the target CU respectively to obtain the first division decision result for each of the sub-CUs comprises:

determining the four sub-CUs of the target CU as target CUs respectively according to a preset rule and returning to the step of determining a current level of the target CU.

8. An encoder, comprising at least one processor, wherein the at least one processor is configured to perform operations comprising obtaining a target coding unit (CU);

determining a current level of the target CU;

obtaining a predicted level of the target CU according to a preset level prediction rule;

determining whether the current level is smaller than the predicted level;

in case of the current level smaller than the predicted level, performing division decisions on four sub-CUs of the target CU respectively to obtain a first division decision result for each of the sub-CUs;

determining whether the first division decision results meet a preset first skip condition; and in case of the first division decision results meeting the preset first skip condition, determining a target division decision result for the target CU as a second division decision result, wherein the second division decision result comprises a division result for dividing the target CU into the four sub-CUs and the first division decision results for the four sub-CUs of the target CU, wherein obtaining a predicted level of the target CU according to a preset level prediction rule comprises:

determining whether a level of a left neighboring CU of the target CU and a level of a top neighboring CU of the target CU are known, in case of the level of the left neighboring CU being known and the level of the top neighboring CU being unknown, determining the predicted level of the target CU as the level of the left neighboring CU, in case of the level of the top neighboring CU being known and the level of the left neighboring CU being unknown, determining the predicted level of the target CU as the level of the top neighboring CU, in case of the level of the left neighboring CU and the level of the top neighboring CU being known, determining the predicted level of the target CU as a highest level of the level of the left neighboring CU and the level of the top neighboring CU, and in case of the level of the left neighboring CU and the level of the top neighboring CU being unknown, determining the predicted level of the target CU as a level of a reference CU, wherein when the reference CU is not available, determining the predicted level of the target CU as 0, wherein the reference CU comprises a CU in a previous video frame before a video frame where the target CU is located, and a position of the CU in the previous video frame is the same as a position of the target CU in the video frame.

9. The encoder of claim 8, wherein when the first division decision results do not meet the preset first skip condition, the operations further comprises:

performing a mode decision on the target CU to obtain a mode decision result for the target CU; and determining the target division decision result for the target CU as an optimal division decision result of the second division decision result and a third division decision result, wherein the third division decision result comprises a division result for not dividing the target CU and the mode decision result for the target CU.

10. The encoder of claim 9, wherein determining the target division decision result for the target CU as an optimal division decision result of the second division decision result and a third division decision result comprises:

determining whether a rate-distortion cost in the second division decision result is smaller than or equal to a rate-distortion cost in the third division decision result;

in case of the rate-distortion cost in the second division decision result smaller than or equal to the rate-distortion cost in the third division decision result, determining the target division decision result for the target CU as the second division decision result; and in case of the rate-distortion cost in the second division decision result not smaller than and not equal to the rate-distortion cost in the third division decision result, determining the target division decision result for the target CU as the third division decision result.

11. The encoder of claim 8, wherein when the current level is not smaller than the predicted level, the operations further comprises:

performing a mode decision on the target CU to obtain a mode decision result for the target CU;

determining whether the mode decision result for the target CU meets a preset second skip condition; and in case of the mode decision result for the target CU meeting the preset second skip condition, determining the target division decision result for the target CU as a third division decision result.

12. The encoder of claim 9, wherein performing a mode decision on the target CU to obtain a mode decision result for the target CU comprises:

calculating a rate-distortion cost for the target CU to obtain the mode decision result for the target CU.

13. The encoder of claim 11, wherein when the mode decision result for the target CU does not meet the preset second skip condition, the operations further comprises:

performing the division decisions on the four sub-CUs of the target CU respectively to obtain the first division decision result for each of the sub-CUs; and determining the target division decision result for the target CU as an optimal division decision result of the second division decision result and the third division decision result.

14. The encoder of claim 8, wherein performing the division decisions on the four sub-CUs of the target CU respectively to obtain the first division decision result for each of the sub-CUs comprises:

determining the four sub-CUs of the target CU as target CUs respectively according to a preset rule and returning to the operation of determining a current level of the target CU.

15. A non-transitory computer-readable storage medium, having stored thereon a computer program that, when executed by a processor, causes the processor to carry out operations comprising:

obtaining a target coding unit (CU);
determining a current level of the target CU;
obtaining a predicted level of the target CU according to a preset level prediction rule;
determining whether the current level is smaller than the predicted level;
in case of the current level smaller than the predicted level, performing division decisions on four sub-CUs of the target CU respectively to obtain a first division decision result for each of the sub-CUs;
determining whether the first division decision results meet a preset first skip condition; and
in case of the first division decision results meeting the preset first skip condition, determining a target division decision result for the target CU as a second division decision result, wherein the second division decision result comprises a division result for dividing the target CU into the four sub-CUs and the first division decision results for the four sub-CUs of the target CU, wherein obtaining a predicted level of the target CU according to a preset level prediction rule comprises:

determining whether a level of a left neighboring CU of the target CU and a level of a top neighboring CU of the target CU are known, in case of the level of the left neighboring CU being known and the level of the top neighboring CU being unknown, determining the predicted level of the target CU as the level of the left neighboring CU, in case of the level of the top neighboring CU being known and the level of the left neighboring CU being unknown, determining the predicted level of the target CU as the level of the top neighboring CU, in case of the level of the left neighboring CU and the level of the top neighboring CU being known, determining the predicted level of the target CU as a highest level of the level of the left neighboring CU and the level of the top neighboring CU, and in case of the level of the left neighboring CU and the level of the top neighboring CU being unknown, determining the predicted level of the target CU as a level of a reference CU, wherein when the reference CU is not available, determining the predicted level of the target CU as 0, wherein the reference CU comprises a CU in a previous video frame before a video frame where the target CU is located, and a position of the CU in the previous video frame is the same as a position of the target CU in the video frame.

16. The storage medium of claim 15, wherein when the first division decision results do not meet the preset first skip condition, the method further comprises:

performing a mode decision on the target CU to obtain a mode decision result for the target CU; and determining the target division decision result for the target CU as an optimal division decision result of the second division decision result and a third division decision result, wherein the third division decision result comprises a division result for not dividing the target CU and the mode decision result for the target CU.

17. The storage medium of claim 16, wherein determining the target division decision result for the target CU as an optimal division decision result of the second division decision result and a third division decision result comprises:

determining whether a rate-distortion cost in the second division decision result is smaller than or equal to a rate-distortion cost in the third division decision result;

in case of the rate-distortion cost in the second division decision result smaller than or equal to the rate-distortion cost in the third division decision result, determining the target division decision result for the target CU as the second division decision result; and in case of the rate-distortion cost in the second division decision result not smaller than and not equal to the rate-distortion cost in the third division decision result, determining the target division decision result for the target CU as the third division decision result.

18. The storage medium of claim 15, wherein when the current level is not smaller than the predicted level, the method further comprises:

performing a mode decision on the target CU to obtain a mode decision result for the target CU;

determining whether the mode decision result for the target CU meets a preset second skip condition; and in case of the mode decision result for the target CU meeting the preset second skip condition, determining the target division decision result for the target CU as a third division decision result, wherein the third division decision result comprises a division result for not dividing the target CU and the mode decision result for the target CU.

* * * * *